United States Patent
Seo et al.

(10) Patent No.: US 10,868,903 B2
(45) Date of Patent: Dec. 15, 2020

(54) ELECTRONIC DEVICE AND CONTROL METHOD THEREFOR

(71) Applicant: Samsung Electronics Co., Ltd., Suwon-si (KR)

(72) Inventors: Ji-Hwan Seo, Suwon-si (KR); Myeong-Gi Jeong, Incheon (KR); Jae-Hong Jo, Hwaseong-si (KR); Hyun-A Jo, Goyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/771,918

(22) PCT Filed: Sep. 20, 2016

(86) PCT No.: PCT/KR2016/010472
§ 371 (c)(1),
(2) Date: Apr. 27, 2018

(87) PCT Pub. No.: WO2017/086586
PCT Pub. Date: May 26, 2017

(65) Prior Publication Data
US 2018/0332158 A1  Nov. 15, 2018

(30) Foreign Application Priority Data

Nov. 16, 2015 (KR) .................. 10-2015-0160413

(51) Int. Cl.
*H04M 1/725* (2006.01)
*G06F 3/041* (2006.01)

(52) U.S. Cl.
CPC .......... *H04M 1/725* (2013.01); *G06F 3/0416* (2013.01); *H04M 1/72533* (2013.01); *H04M 2250/22* (2013.01)

(58) Field of Classification Search
CPC ...... G06F 3/0416; G06F 3/041; H04M 1/725; H04M 1/72533
See application file for complete search history.

(56) References Cited

U.S. PATENT DOCUMENTS

2008/0247757 A1  10/2008  Um et al.
2011/0170787 A1  7/2011  Gum
(Continued)

FOREIGN PATENT DOCUMENTS

JP  2013-517568 A  5/2013
JP  2013-164761 A  8/2013
(Continued)

*Primary Examiner* — Kent W Chang
*Assistant Examiner* — Chayce R Bibbee
(74) *Attorney, Agent, or Firm* — Jefferson IP Law, LLP

(57) ABSTRACT

Disclosed is an electronic device. An electronic device according to an embodiment controls a plurality of external electronic devices. The electronic device may comprise: a communication module configured to transmit a control signal to each of the plurality of external electronic devices; a display for receiving a first input for controlling each of the plurality of external electronic devices, and receiving a second input provided in a predetermined direction; and a processor for controlling the communication module to transmit a control signal corresponding to the received first input to at least one external electronic device corresponding to a direction of the second input, from among the plurality of external electronic devices.

15 Claims, 26 Drawing Sheets

(56) References Cited

U.S. PATENT DOCUMENTS

| | | |
|---|---|---|
| 2013/0106738 A1 | 5/2013 | Kim et al. |
| 2013/0208312 A1 | 8/2013 | Morita |
| 2014/0266639 A1 | 9/2014 | Zises |
| 2014/0282103 A1* | 9/2014 | Crandall ............... H04L 65/403 715/753 |
| 2014/0368474 A1 | 12/2014 | Kim et al. |
| 2015/0067080 A1 | 3/2015 | Cho et al. |

FOREIGN PATENT DOCUMENTS

| | | |
|---|---|---|
| KR | 10-2013-0048533 A | 5/2013 |
| KR | 10-2014-0037519 A | 3/2014 |
| KR | 10-2015-0005800 A | 1/2015 |
| KR | 10-2015-0028008 A | 3/2015 |

\* cited by examiner

ELECTRONIC DEVICE AND CONTROL METHOD THEREFOR

TECHNICAL FIELD

The present disclosure generally relates to an electronic device and a control method therefor, and more particularly, to a method of controlling an external electronic device adjacent to an electronic device using a small number of inputs.

BACKGROUND ART

Recently, a technology that enables users to control devices around a smart phone using the smart phone solely has been disclosed.

Particularly, a user can control various electronic devices connected to a smart phone via a short-range network (e.g., a temperature controller, a refrigerator, an air-conditioner, a TV, a light, and the like) in parallel or separately. Such a technology may be defined as the Internet of Things (IoT).

A user can turn on or off various electronic devices located in a short distance, can control the desired temperature of an air-conditioner, can change a TV channel, or can turn on or off a light, using a smart phone, via IoT technology.

DETAILED DESCRIPTION OF THE INVENTION

Technical Problem

According to aspects of the present disclosure, when a user uses legacy IoT technology, the user needs to install corresponding device control applications to a smart phone separately for limited electronic devices, and the smart phone provides a separate User Interface (UI) for each electronic device. In order to control each electronic device, the user needs to follow an operation provided by each device control application.

Accordingly, in order to control an external electronic device, the user needs to install a control application for each electronic device, and needs to use a user interface provided by an application, which is a drawback.

The present disclosure is derived to overcome the above described drawback and other drawbacks, and may provide an electronic device capable of easily controlling an external electronic device using a smart phone or other smart devices.

Technical Solution

In accordance with an aspect of the present disclosure, an electronic device for controlling a plurality of external electronic devices may include: a communication module configured to transmit a control signal to each of the plurality of external electronic devices; a display configured to receive a first input for controlling each of the plurality of external electronic devices and a second input provided in a predetermined direction; and a processor configured to control the communication module such that a control signal corresponding to the received first input is transmitted to at least one external electronic device corresponding to the direction of the second input, from among the plurality of external electronic devices.

In accordance with an aspect of the present disclosure, a method of controlling a plurality of external electronic devices by an electronic device may include: receiving a first input for controlling each of the plurality of external electronic devices; and transmitting a control signal corresponding to the received first input to at least one external electronic device corresponding to a direction in which the second input is received by the electronic device, from among the plurality of external electronic devices.

Advantageous Effects

According to various embodiments of the present disclosure, a user can easily write an instruction to be sent to an external electronic device via a smart phone.

Also, according to various embodiments of the present disclosure, a user can control each external electronic device by providing an easily written instruction using a simple input motion, such as a swipe input or a drag input or the like.

BRIEF DESCRIPTION OF DRAWINGS

The above and other aspects, features and advantages of the present disclosure will be more apparent from the following detailed description taken in conjunction with the accompanying drawings, in which.

MODE FOR CARRYING OUT THE INVENTION

Figure 1:
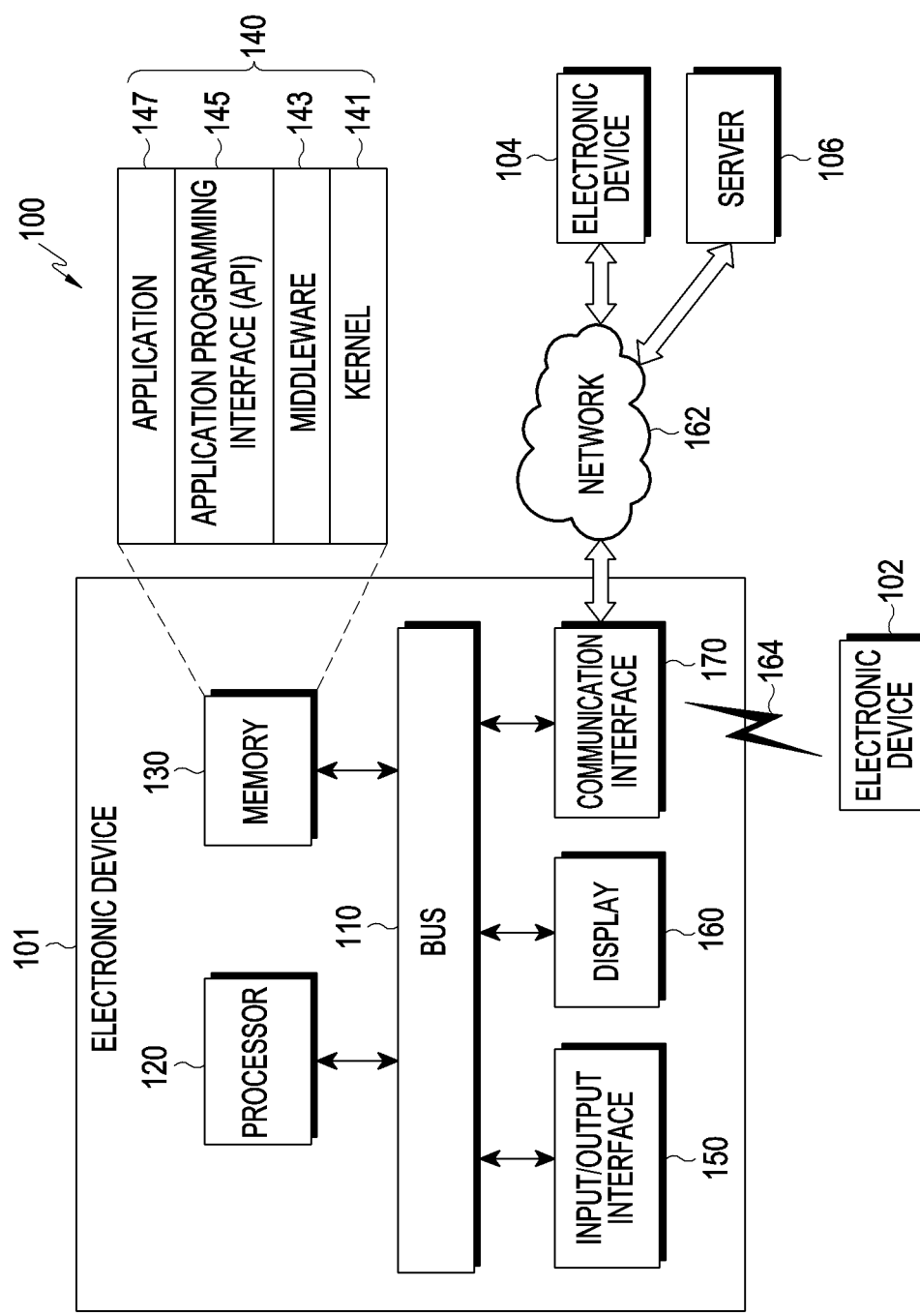
FIG. 1 is a block diagram of an electronic device and a network according to various embodiments of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

FIG. 1 illustrates a network environment including an electronic device according to various embodiments of the present disclosure.

Referring to FIG. 1, an electronic device 101 within a network environment 100 according to various embodiments will be described. The electronic device 101 may include a bus 110, a processor 120, a memory 130, an input/output interface 150, a display 160, and a communication module 170. In some embodiments, the electronic device 101 may omit at least one of the elements, or may further include other elements.

The bus 110 may include, for example, a circuit that interconnects the elements 110 to 170 and delivers communication (e.g., a control message and/or data) between the elements 110 to 170.

The processor 120 may include one or more of a Central Processing Unit (CPU), an Application Processor (AP), and a Communication Processor (CP). The processor 120, for example, may carry out operations or data processing relating to the control and/or communication of at least one other element of the electronic device 101.

The memory 130 may include a volatile and/or non-volatile memory. The memory 130 may store, for example, commands or data relevant to at least one other element of the electronic device 101. According to an embodiment, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (e.g., the bus 110, the processor 120, or the memory 130) used for executing an operation or function implemented by other programs (e.g., the middleware 143, the API 145, or the application 147). Furthermore, the kernel 141 may provide an interface via which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data.

Furthermore, the middleware 143 may process one or more task requests, which are received from the application programs 147, according to priorities thereof. For example, the middleware 143 may assign priorities to use the system resources (e.g., the bus 110, the processor 120, the memory 130, or the like) of the electronic device 101, to at least one of the application programs 147. For example, the middleware 143 may perform scheduling or load balancing on the one or more task requests by processing the one or more task requests according to the priorities assigned to the one or more application programs.

The API 145 is, for example, an interface via which the applications 147 control functions provided from the kernel 141 or the middleware 143, and may include, for example, at least one interface or function (e.g., instruction) for file control, window control, image processing, or text control.

The input/output interface 150 may function as, for example, an interface that can forward commands or data, which are input from a user or an external device, to the other element(s) of the electronic device 101. Furthermore, the input/output interface 150 may output commands or data, which are received from the other element(s) of the electronic device 101, to a user or an external device.

The display 160 may include, for example, a Liquid Crystal Display (LCD), a Light-Emitting Diode (LED) display, an Organic Light-Emitting Diode (OLED) display, a MicroElectroMechanical Systems (MEMS) display, and an electronic paper display. The display 160 may display, for example, various types of contents (e.g., text, images, videos, icons, symbols, and the like) for a user. The display 160 may include a touch screen, and may receive, for example, a touch input, a gesture input, a proximity input, or a hovering input using an electronic pen or the user's body part.

The communication module 170 may configure communication, for example, between the electronic device 101 and an external device (e.g., a first external electronic device 102, a second external electronic device 104, or a server 106). For example, the communication module 170 may be connected to a network 162 via wireless or wired communication to communicate with an external device (e.g., the second external electronic device 104 or the server 106).

The wireless communication may use, for example, at least one of Long Term Evolution (LTE), LTE-Advanced (LTE-A), Code Division Multiple Access (CDMA), Wideband CDMA (WCDMA), Universal Mobile Telecommunications System (UMTS), WiBro (Wireless Broadband), Global System for Mobile Communications (GSM), and the like, as a cellular communication protocol. In addition, the wireless communication may include, for example, short-range communication 164. The short-range communication 164 may include at least one of, for example, Wi-Fi, Bluetooth, Near Field Communication (NFC), Global Navigation Satellite System (GNSS), and the like. The GNSS may include at least one of, for example, a Global Positioning System (GPS), a Global navigation satellite system (Glonass), a Beidou navigation satellite system (hereinafter, referred to as "Beidou"), and Galileo (European global satellite-based navigation system) according to a used area or a bandwidth thereof. Hereinafter, in the present document, the term "GPS" may be interchangeably used with the term "GNSS". The wired communication may include, for example, at least one of a Universal Serial Bus (USB), a High Definition Multimedia Interface (HDMI), Recommended Standard 232 (RS-232), a Plain Old Telephone Service (POTS), and the like. The network 162 may include at least one of a telecommunication network such as a computer network (e.g., a LAN or a WAN), the Internet, and a telephone network.

Each of the first and second external electronic devices 102 and 104 may be of a type that is the same as or different from the electronic device 101. According to an embodiment, the server 106 may include a group of one or more servers. According to various embodiments, all or some of the operations executed in the electronic device 101 may be executed in another electronic device or a plurality of electronic devices (e.g., the electronic devices 102 and 104 or the server 106). According to an embodiment, when the electronic device 101 has to perform some functions or services automatically or in response to a request, the electronic device 101 may make a request for performing at least some functions relating thereto to another device (e.g., the electronic device 102 or 104 or the server 106) instead of, or in addition to, performing the functions or services by itself. Another electronic device (e.g., the electronic device 102 or 104, or the server 106) may execute the requested functions or the additional functions, and may deliver a result of the execution to the electronic device 101. The electronic device 101 may provide the received result as it is, or may additionally process the received result to provide the requested functions or services. To this end, for example, cloud computing, distributed computing, or client-server computing technology may be used.

Figure 2:
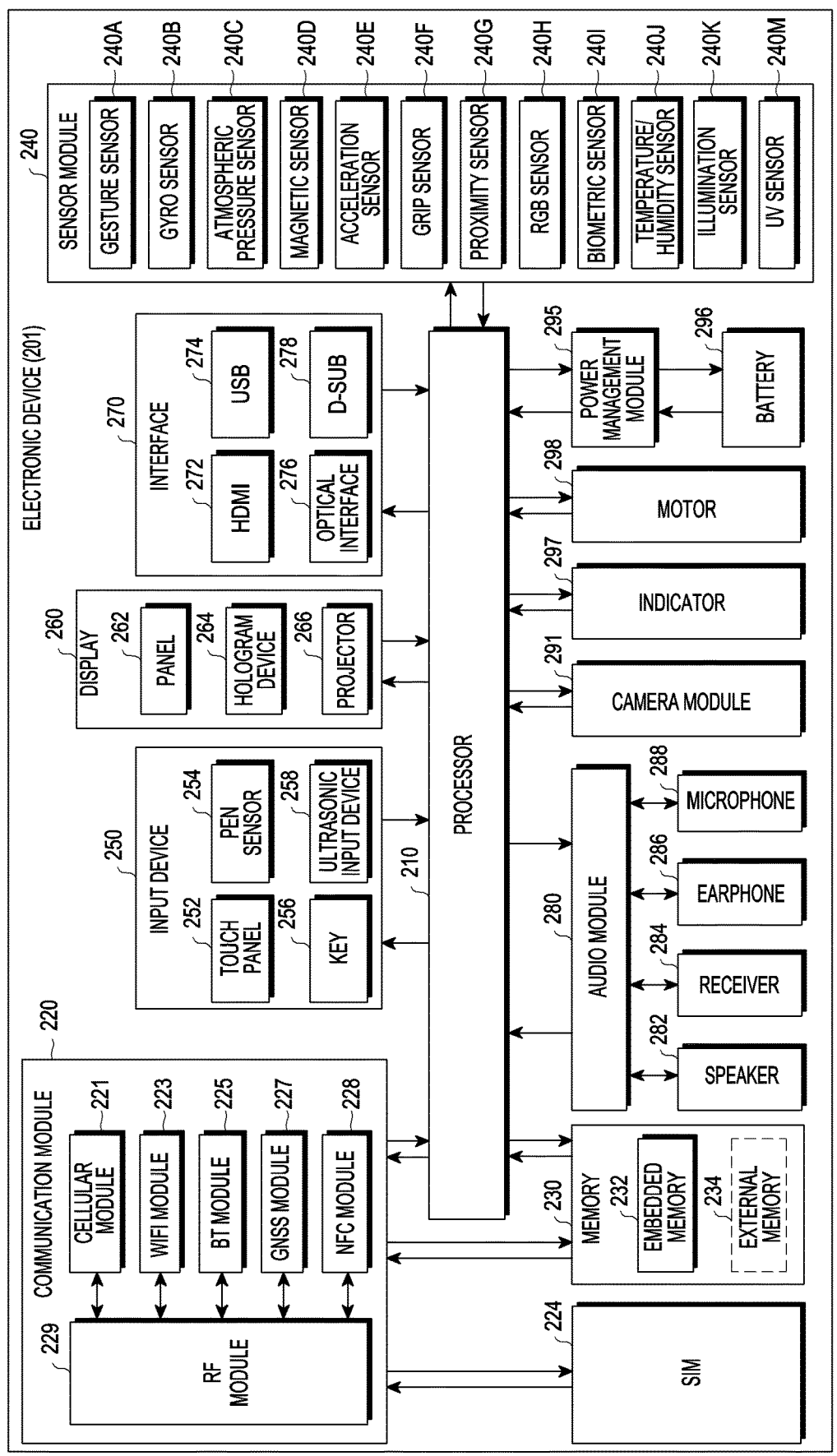
FIG. 2 is a block diagram of an electronic device according to various embodiments.

FIG. 2 is a block diagram of an electronic device 201 according to various embodiments. The electronic device 201 may include, for example, the whole or a part of the electronic device 101 illustrated in FIG. 1. The electronic device 201 may include at least one processor 210 (e.g., an Application Processor (AP)), a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software elements connected thereto and may perform various data processing and operations by driving an operating system or an application program. The processor 210 may be implemented as, for example, a System on Chip (SoC). According to an embodiment, the processor 210 may further include a Graphic Processing Unit (GPU) and/or an image signal processor. The processor 210 may also include at least some of the elements illustrated in FIG. 2 (e.g., a cellular module 221). The processor 210 may load, in a volatile memory, commands or data received from at least one of the other elements (e.g., a non-volatile memory) to process the loaded commands or data, and may store various types of data in the non-volatile memory.

The communication module 220 may have a configuration the same as or similar to that of the communication interface 170 of FIG. 1. The communication module 220 may include, for example, a cellular module 221, a Wi-Fi module 223, a BT module 225, a GNSS module 227 (e.g., a GPS module, a Glonass module, a Beidou module, or a Galileo module), an NFC module 228, and a Radio Frequency (RF) module 229.

The cellular module 221 may provide, for example, a voice call, a video call, a text message service, an Internet service, or the like via a communication network. According to an embodiment, the cellular module 221 may identify and authenticate the electronic device 201 within a communication network using the subscriber identification module 224 (e.g., a SIM card). According to an embodiment, the cellular module 221 may perform at least some of the functions that the processor 210 may provide. According to an embodiment, the cellular module 221 may include a Communication Processor (CP).

For example, each of the Wi-Fi module 223, the BT module 225, the GNSS module 227, and the NFC module 228 may include a processor for processing data transmitted/received via a corresponding module. According to some embodiments, at least some (e.g., two or more) of the cellular module 221, the Wi-Fi module 223, the BT module 225, the GNSS module 227, and the NFC module 228 may be included in one Integrated Chip (IC) or IC package.

The RF module 229 may transmit/receive, for example, a communication signal (e.g., an RF signal). The RF module 229 may include, for example, a transceiver, a Power Amplifier Module (PAM), a frequency filter, a Low Noise Amplifier (LNA), an antenna, and the like. According to another embodiment, at least one of the cellular module 221, the Wi-Fi module 223, the BT module 225, the GNSS module 227, and the NFC module 228 may transmit/receive an RF signal via a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an embedded memory 232 or an external memory 234. The embedded memory 232 may include, for example, at least one of a volatile memory (e.g., a Dynamic RAM (DRAM), a Static RAM (SRAM), a Synchronous Dynamic RAM (SDRAM), or the like.) and a non-volatile memory (e.g., an Onetime Programmable ROM (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard disc drive, a Solid State Drive (SSD), or the like).

The external memory 234 may further include a flash drive, for example, a Compact Flash (CF), a Secure Digital (SD), a Micro-Secure Digital (Micro-SD), a Mini-Secure Digital (Mini-SD), an extreme Digital (xD), a Multi-Media Card (MMC), a memory stick, or the like. The external memory 234 may be functionally and/or physically connected to the electronic device 201 via various interfaces.

The sensor module 240 may, for example, measure a physical quantity or detect the operating state of the electronic device 201, and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, an illumination sensor 240K, and a ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments, the electronic device 201 may further include a processor, which is configured to control the sensor module 240, as a part of the processor 210 or separately from the processor 210, and may control the sensor module 240 while the processor 210 is in a sleep state.

The input device 250 may include, for example, a touch panel 252, a (digital) pen sensor 254, a key 256, or an ultrasonic input device 258. The touch panel 252 may use, for example, at least one of a capacitive type, a resistive type, an infrared type, and an ultrasonic type. Furthermore, the touch panel 252 may further include a control circuit. The touch panel 252 may further include a tactile layer to provide a tactile reaction to a user.

The (digital) pen sensor 254 may include, for example, a recognition sheet that is a part of, or separate from, the touch panel. The key 256 may include, for example, a physical button, an optical key, or a keypad. The ultrasonic input device 258 may detect ultrasonic waves, which are generated by an input tool, via a microphone (e.g., a microphone 288), and may identify data corresponding to the detected ultrasonic waves.

The display 260 (e.g., the display 160) may include a panel 262, a hologram device 264, or a projector 266. The panel 262 may have a configuration that is the same as, or similar to, that of the display 160 illustrated in FIG. 1. The panel 262 may be implemented to be, for example, flexible, transparent, or wearable. The panel 262, together with the touch panel 252, may be implemented as one module. The hologram device 264 may show a three dimensional image in the air by using light interference. The projector 266 may display an image by projecting light onto a screen. The screen may be located, for example, in the interior of, or on the exterior of, the electronic device 201. According to one embodiment, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, or a D-subminiature (D-sub) 278. The interface 270 may be included in, for example, the communication circuit 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may convert, for example, a sound into an electrical signal, and vice versa. At least some elements of the audio module 280 may be included, for example, in the input/output interface 150 illustrated in FIG. 1. The audio module 280 may process sound information that is input or output via, for example, a speaker 282, a receiver 284, earphones 286, the microphone 288, and the like.

The camera module 291 is a device that can photograph a still image and a video. According to an embodiment, the camera module 291 may include one or more image sensors (e.g., a front sensor or a rear sensor), a lens, an Image Signal Processor (ISP), or a flash (e.g., an LED, a xenon lamp, or the like).

The power management module 295 may manage, for example, the power of the electronic device 201. According to an embodiment, the power management module 295 may include a Power Management Integrated Circuit (PMIC), a charger Integrated Circuit (IC), or a battery or fuel gauge. The PMIC may use a wired and/or wireless charging method. Examples of the wireless charging method may include a magnetic resonance method, a magnetic induction method, an electromagnetic wave method, and the like. Additional circuits for wireless charging, for example, a coil loop, a resonance circuit, a rectifier, and the like, may be further included. The battery gauge may measure, for example, the amount of charge remaining in the battery 296, and a voltage, current, or temperature while charging. The battery 296 may include, for example, a rechargeable battery and/or a solar battery.

The indicator 297 may display a particular state, for example, a booting state, a message state, a charging state, or the like of the electronic device 201 or a part (e.g., the processor 210) of the electronic device 201. The motor 298 may convert an electrical signal into a mechanical vibration and may generate a vibration, a haptic effect, and the like. Although not illustrated, the electronic device 201 may include a processing unit (e.g., a GPU) for supporting mobile TV. The processing unit for supporting the mobile TV may process media data according to a standard, such as Digital Multimedia Broadcasting (DMB), Digital Video Broadcasting (DVB), MediaFlo™, and the like.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
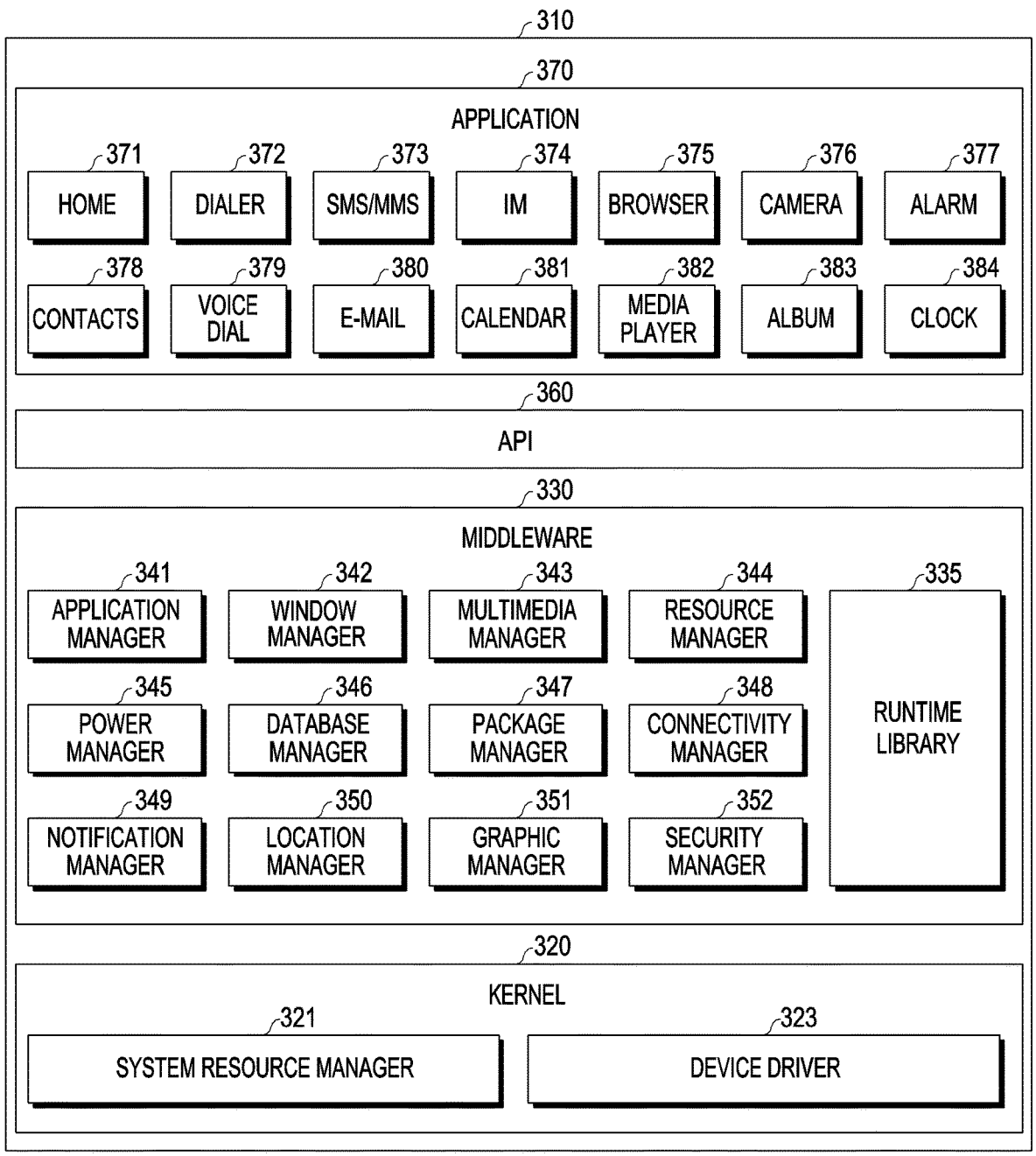
FIG. 3 is a block diagram of a program module according to various embodiments.

FIG. 3 is a block diagram of a program module according to various embodiments. According to an embodiment, the program module 310 (e.g., the program 140) may include an Operating System (OS) that controls resources relating to an electronic device (e.g., the electronic device 101) and/or various applications (e.g., the application programs 147) that are executed in the operating system. The operating system may be, for example, Android, iOS, Windows, Symbian, Tizen, Bada, and the like.

The program module 310 may include a kernel 320, middleware 330, an Application Programming Interface (API) 360, and/or applications 370. At least a part of the program module 310 may be preloaded on the electronic device, or may be downloaded from an external electronic device (e.g., the electronic device 102 or 104, or the server 106).

The kernel 320 (e.g., the kernel 141) may include, for example, a system resource manager 321 and/or a device driver 323. The system resource manager 321 may control, allocate, or retrieve system resources. According to an embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may provide, for example, a function required by the applications 370 in common, or may provide various functions to the applications 370 via the API 360 such that the applications 370 can efficiently use limited system resources within the electronic device. According to an embodiment, the middleware 330 (e.g., the middleware 143) may include at least one of, for example, a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function via a programming language while the applications 370 are being executed. The runtime library 335 may perform input/output management, memory management, the functionality for an arithmetic function, and the like.

The application manager 341 may manage, for example, the life cycle of at least one of the applications 370. The window manager 342 may manage Graphical User Interface (GUI) resources used on a screen. The multimedia manager 343 may determine formats required for reproducing various media files and may encode or decode a media file using a coder/decoder (codec) appropriate for a corresponding format. The resource manager 344 may manage resources, such as the source code, the memory, the storage space, and the like of at least one of the applications 370.

The power manager 345 may operate together with, for example, a Basic Input/Output System (BIOS) to manage a battery or power, and provide power information required for the operation of the electronic device. The database manager 346 may generate, search for, and/or change a database to be used by at least one of the applications 370. The package manager 347 may manage the installation or update of an application that is distributed in the form of a package file.

The connectivity manager 348 may manage a wireless connection, such as Wi-Fi, Bluetooth, and the like. The notification manager 349 may display or notify of an event, such as an arrival message, an appointment, a proximity notification, and the like, in such a manner as not to disturb a user. The location manager 350 may manage the position information of the electronic device. The graphic manager 351 may manage a graphic effect to be provided to a user and a user interface relating to the graphic effect. The security manager 352 may provide various security functions required for system security, user authentication, and the like. According to an embodiment, in a case where the electronic device (e.g., the electronic device 101) has a telephone call function, the middleware 330 may further include a telephony manager for managing a voice or video call function of the electronic device.

The middleware 330 may include a middleware module that forms a combination of various functions of the above-described elements. The middleware 330 may provide specialized modules according to the types of operating systems in order to provide differentiated functions. Furthermore, the middleware 330 may dynamically remove some of the existing elements, or may add new elements.

The API 360 (e.g., the API 145) is, for example, a set of API programming functions, and may be provided in different configurations according to operating systems. For example, in the case of Android or iOS, one API set may be provided for each platform, and in the case of Tizen, two or more API sets may be provided for each platform.

The applications 370 (e.g., the application programs 147) may include, for example, one or more applications that are capable of providing functions such as home 371, dialer 372, SMS/MMS 373, Instant Message (IM) 374, browser 375, camera 376, alarm 377, contacts 378, voice dialer 379, email 380, calendar 381, media player 382, album 383, clock 384, health care (e.g., measuring exercise quantity or blood sugar), environment information (e.g., atmospheric pressure, humidity, or temperature information), and the like.

According to an embodiment, the applications 370 may include an application (hereinafter, referred to as an "information exchange application" for convenience of description) supporting information exchange between the electronic device (e.g., the electronic device 101) and an external electronic device (e.g., the electronic device 102 or 104). The information exchange application may include, for example, a notification relay application for transferring predetermined information to an external electronic device or a device management application for managing an external electronic device.

For example, the notification relay application may include a function of delivering, to the external electronic device (e.g., the electronic device 102 or 104), notification information generated by other applications (e.g., an SMS/MMS application, an email application, a health care application, an environmental information application, and the like) of the electronic device. Furthermore, the notification relay application may, for example, receive notification information from an external electronic device and may provide the received notification information to a user.

The device management application may manage (e.g., install, delete, or update), for example, at least one function of an external electronic device (e.g., the electronic device 102 or 104) that communicates with the electronic device (e.g., a function of turning on/off the external electronic device itself (or some elements thereof) or a function of adjusting the brightness (or resolution) of a display), applications that operate in the external electronic device, or services (e.g., a call service, a message service, and the like) that are provided by the external electronic device.

According to an embodiment, the applications 370 may include applications (e.g., a health care application of a mobile medical appliance, and the like) that are designated according to attributes of an external electronic device (e.g., the electronic device 102 or 104). According to an embodiment, the applications 370 may include an application received from an external electronic device (e.g., the server 106, or the electronic device 102 or 104). According to an embodiment, the applications 370 may include preloaded applications or third-party applications that can be downloaded from a server. Names of the elements of the program module 310 according to the above-described embodiments may change depending on the type of operating system.

According to various embodiments, at least a part of the program module 310 may be implemented as software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

Figure 4:
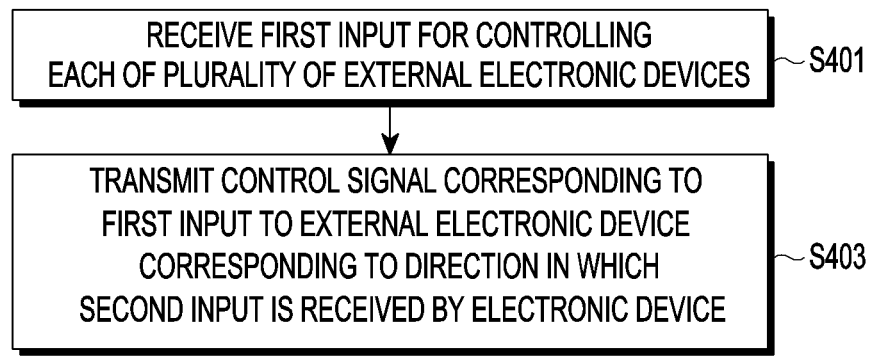
FIG. 4 is a flowchart illustrating a control method of an electronic device according to various embodiments of the present disclosure.

FIG. 4 is a flowchart illustrating a control method of an electronic device according to various embodiments of the present disclosure.

As illustrated in FIG. 4, according to various embodiments, an electronic device (e.g., the electronic device 101) may receive a first input for controlling each of a plurality of external electronic devices (e.g., the electronic device 104) in operation S401.

For example, a display (e.g., the display 160) of the electronic device 101 may receive a first input for controlling each of the plurality of external electronic devices 104.

According to various embodiments, the display 160 may receive a first input for controlling each of the plurality of external electronic devices separately or for controlling at least two external electronic devices together.

According to various embodiments, the first input may be at least one touch input received via a touch panel (e.g., the touch panel 252) included in the display 160. According to various embodiments, the first input may be at least one pen input detected via a pen sensor (e.g., the pen sensor 254). According to various embodiments, the first input may be at least one gesture input detected via a proximity sensor (e.g., the proximity sensor 240G).

According to various embodiments, the first input may be a character input including Hangul or foreign characters. According to various embodiments, the first input may be a number input. According to various embodiments, the first input may be a symbol input. According to various embodiments, the first input may be a figure input. According to various embodiments, the first input may be a touch input. For example, the first input may be a long-touch input or a double-touch input.

According to various embodiments, the first input may be a combination input that combines at least one input from among the above-described inputs. For example, the first input may include a double-touch input after a long-touch input provided during a first period of time. For example, the first input may include a number input "2" and a number input "5".

According to various embodiments, upon reception of the first input, the processor (e.g., the processor 120) of the electronic device may generate a control command corresponding to the first input, and may generate a control signal for transmitting the generated control command to the external electronic device 102.

According to various embodiments, the processor 120 may receive position information associated with each of the plurality of external electronic devices 102 via the communication module 170. According to various embodiments, the processor 120 may control the display 160 so as to display device information (e.g., a device icon) of each of the plurality of external electronic devices 102.

According to various embodiments, in operation S403, the communication module (e.g., the communication module 170) may transmit the control signal corresponding to the first input to an external electronic device 102 corresponding to the direction in which a second input is received by the electronic device 101, according to the control of the processor 120.

According to various embodiments, the second input may include one or more inputs from among at least one swipe input including a predetermined direction and at least one drag-and-drop input. For example, the second input may include a swipe input provided in a first direction and a swipe input provided in a second direction. For example, the second input may include a drag input provided in a third direction and a drag-and-drop provided in a fourth direction. For example, the second input may include a drag input provided in a fifth direction and a drop input on device information (e.g., a device icon).

According to various embodiments, the processor may identity the direction of the second input, may identify at least one external electronic device corresponding to the identified direction of the second input, and may control the communication module 170 such that the control signal corresponding to the first input is transmitted to the at least one identified external electronic device.

Figure 5:
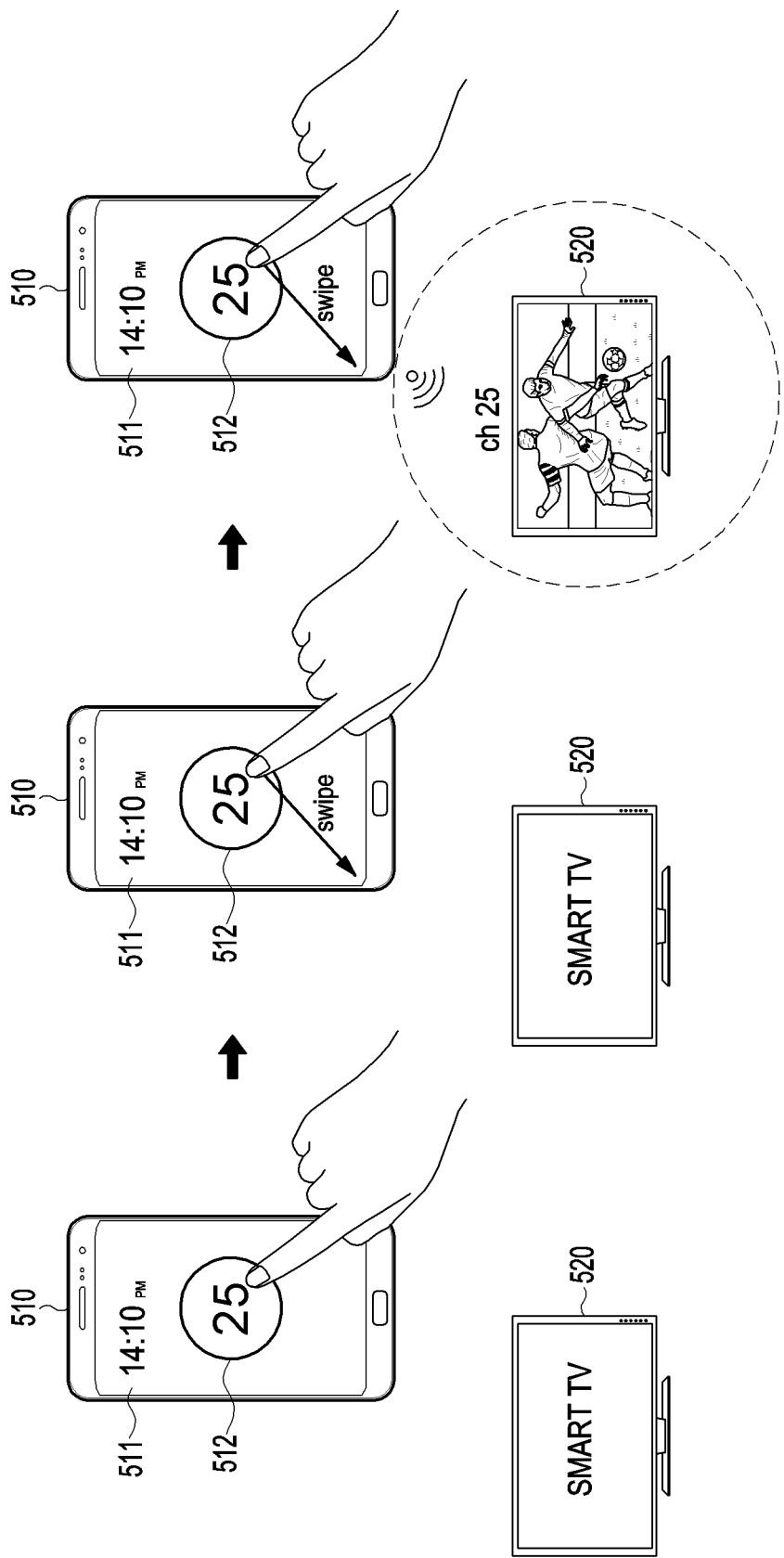
FIG. 5 is a diagram illustrating an example of a control method of an electronic device according to various embodiments of the present disclosure.

FIG. 5 is a diagram illustrating an example of a control method of an electronic device according to various embodiments of the present disclosure.

As illustrated in FIG. 5, for example, a display 511 of an electronic device 510 (smart phone) may receive a first input ("25") for controlling the external electronic device 520.

According to various embodiments, after the first input ("25") is received, the display 511 may display command information 512 according to the first input ("25").

According to various embodiments, after the first input is received and the command information 512 according to the first input is displayed, the display 511 may receive the second input ("swipe input") that starts from the command information 512 and heads, from the center of the display 511, in a direction in which an external electronic device 520 ("SMART TV") is located.

According to various embodiments, after the second input is received, the processor (e.g., the processor 120) may generate a control command ("ch 25", a command to change a channel to "25") corresponding to the received first input ("25"), and may control the communication module (e.g., the communication module 170) such that a control signal including the control command is transmitted to at least one external electronic device 520 corresponding to the direction of the second input ("the direction of "SMART TV").

Figure 6:
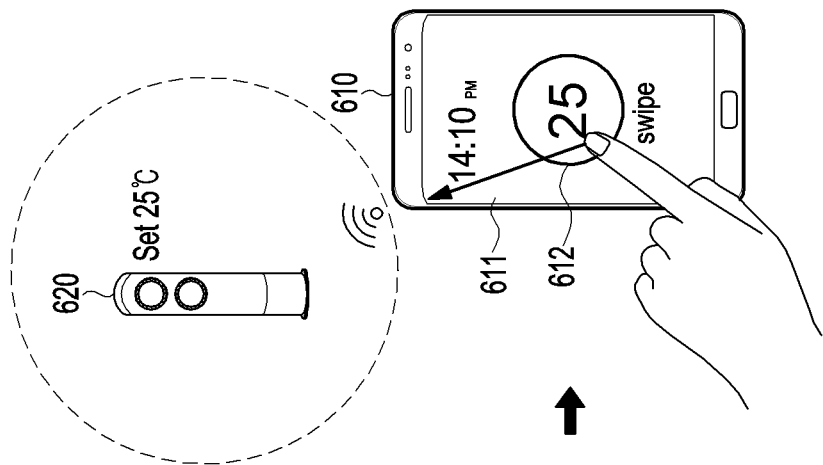
FIG. 6 is a diagram illustrating another example of a control method of an electronic device according to various embodiments of the present disclosure.
Figure 6:
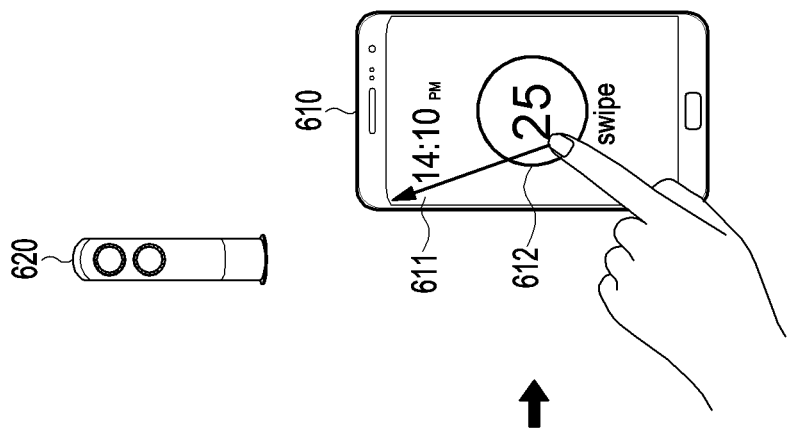
Figure 6:
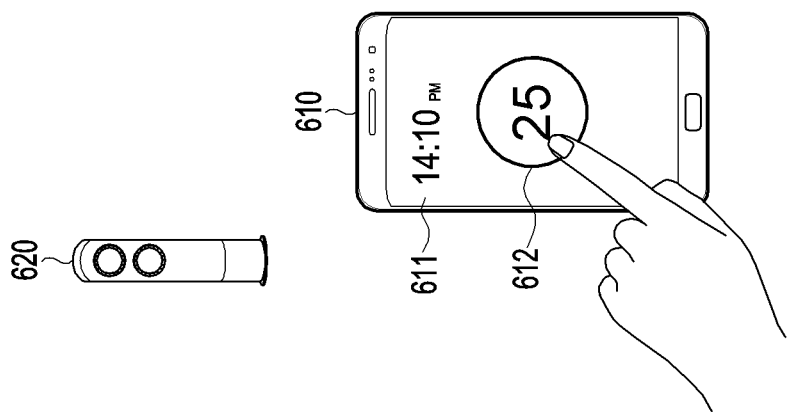

FIG. 6 is a diagram illustrating another example of a control method of an electronic device according to various embodiments of the present disclosure.

As illustrated in FIG. 6, for example, a display 611 of an electronic device 610 may receive a first input ("25") for controlling an external electronic device 620.

According to various embodiments, when the first input ("25") is received, the display 611 may display command information 612 according to the first input ("25").

According to various embodiments, after the first input is received and the command information 612 according to the first input is displayed, the display 611 may receive a second input ("swipe input") that starts from the command information 612 and heads, from the center of the display 611, in a direction in which an external electronic device 620 ("temperature controller") is located.

According to various embodiments, after the second input is received, the processor (e.g., the processor 120) may generate a control command ("Set 25° C.", a command to change a desired temperature to "25° C.") corresponding to the received first input ("25"), and may control the communication module (e.g., the communication module 170) such that a control signal including the control command is transmitted to at least one external electronic device 620 corresponding to the direction of the second input (the direction of "temperature controller").

Figure 7:
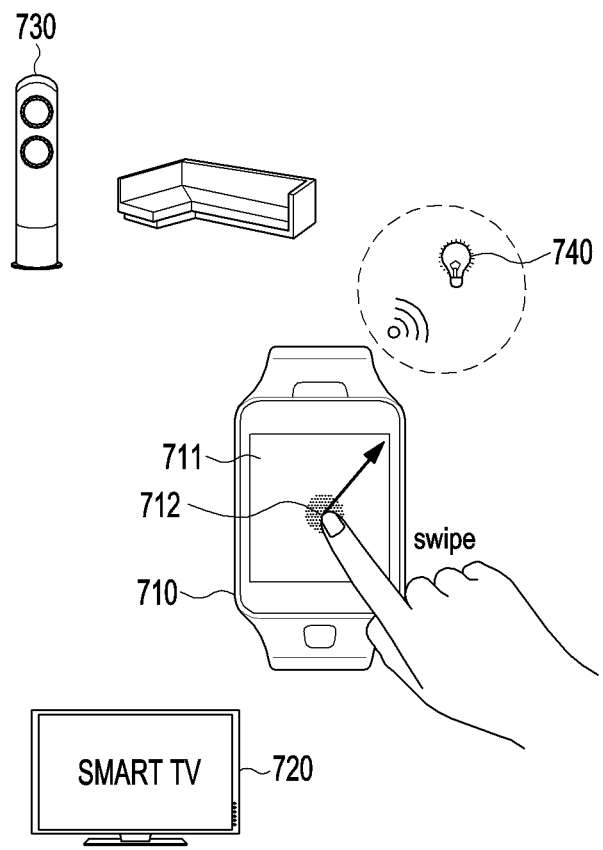
FIG. 7 is a diagram illustrating another example of a control method of an electronic device according to various embodiments of the present disclosure.

FIG. 7 is a diagram illustrating another example of a control method of an electronic device according to various embodiments of the present disclosure.

As illustrated in FIG. 7, for example, a display 711 of an electronic device 710 may receive a first input (a long-touch) for controlling an external electronic device 720.

According to various embodiments, after the first input is received and command information 712 according to the first input is displayed, the display 711 may receive a second input ("swipe input") that starts from the command information 712 and heads, from the center of the display 711, in a direction in which at least one external electronic device 740 ("light") is located from among a plurality of external electronic devices 720, 730, and 740.

According to various embodiments, after the second input is received, the processor (e.g., the processor 120) may generate a control command (ON command) corresponding to the received first input (a long-touch), and may control the communication module (e.g., the communication module 170) such that a control signal including the control command is transmitted to at least one external electronic device 740 corresponding to the direction of the second input ("the direction of "light").

Figure 8:
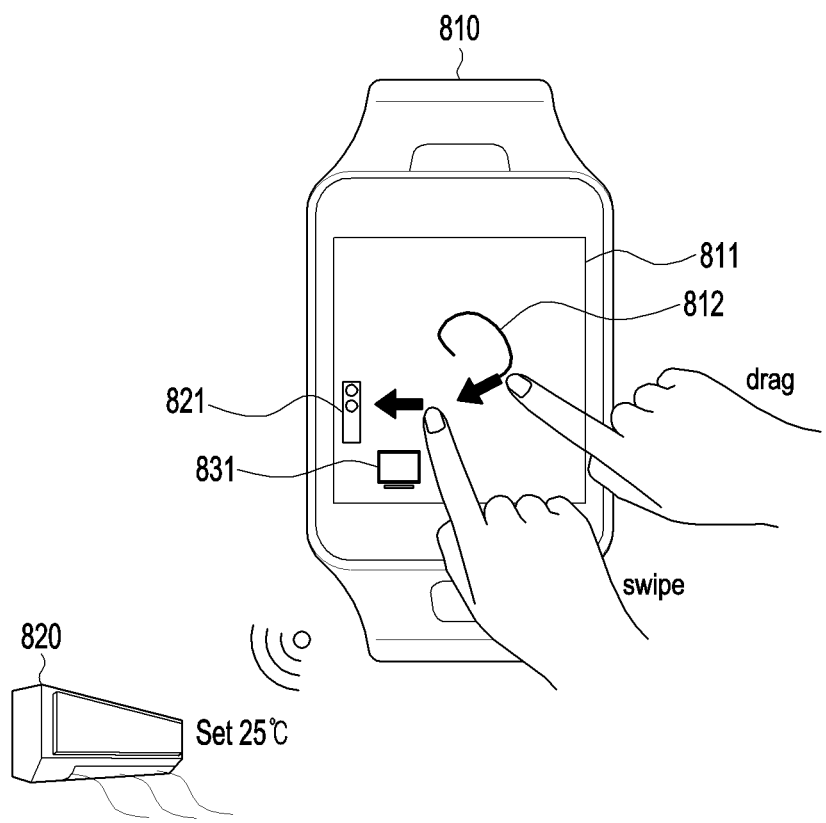
FIG. 8 is a diagram illustrating another example of a control method of an electronic device according to various embodiments of the present disclosure.
Figure 8:

FIG. 8 is a diagram illustrating another example of a control method of an electronic device according to various embodiments of the present disclosure.

As illustrated in FIG. 8, for example, a display 811 of an electronic device 810 may receive a first input (a circle) for controlling an external electronic device 820, and may display command information (a circle) corresponding to the first input (a circle).

Also, according to various embodiments, the display 811 may display device information 821 and 831 or device icons 821 and 831, which respectively correspond to a plurality of external electronic devices 820 and 830. According to various embodiments, the plurality of device icons 821 and 831 may include position information of the plurality of external electronic devices 820 and 830, respectively. For example, the display 811 may display first device information 821 of a first external electronic device (a temperature controller 820) from among a plurality of external electronic devices 820 and 830, based on relative position information associated with the electronic device 810 and the first external electronic device 820.

According to various embodiments, the display 811 may display device information 821 and 831 of at least one external electronic device 820 and 830 which is capable of performing a command (ON command) of a control signal corresponding to the received first input, from among a plurality of external electronic devices.

According to various embodiments, after the first input is received and the command information 812 according to the first input is displayed, the display 811 may receive a second input ("swipe input") that starts from the command information 812 and heads, from the center of the display 811, in a direction in which device information 821 corresponding to at least one external electronic device 820 ("temperature controller") is displayed, from among a plurality of external electronic devices 820 and 830.

According to various embodiments, after the second input is received, the processor (e.g., the processor 120) may generate a control command (ON command) corresponding to the received first input (a circle), and may control the communication module (e.g., the communication module 170) such that a control signal including the control command is transmitted in the direction of the second input (to at least one external electronic device 820 corresponding to the position at which the device information 821 is displayed).

Figure 9:
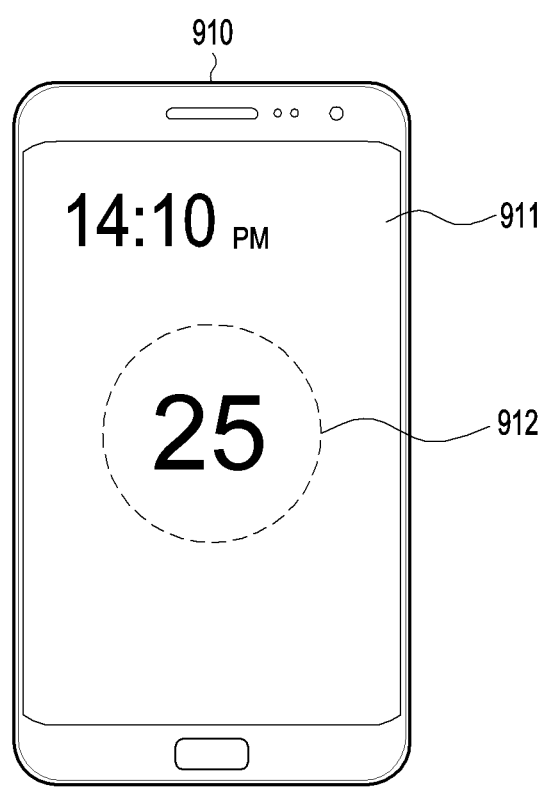
FIG. 9 is a diagram illustrating an example of a device control mode of an electronic device according to various embodiments of the present disclosure.

FIG. 9 is a diagram illustrating an example of a device control mode of an electronic device according to various embodiments of the present disclosure.

As illustrated in FIG. 9, for example, a processor (e.g., the processor 120) of an electronic device 910 may perform control such that an idle screen is displayed via a display 911.

According to various embodiments, the display 911 may be controlled so as to receive a first input ("25") for controlling a plurality of external electronic devices in the state of displaying an idle screen, and to display command information 912 corresponding to the first input ("25").

Figure 10:
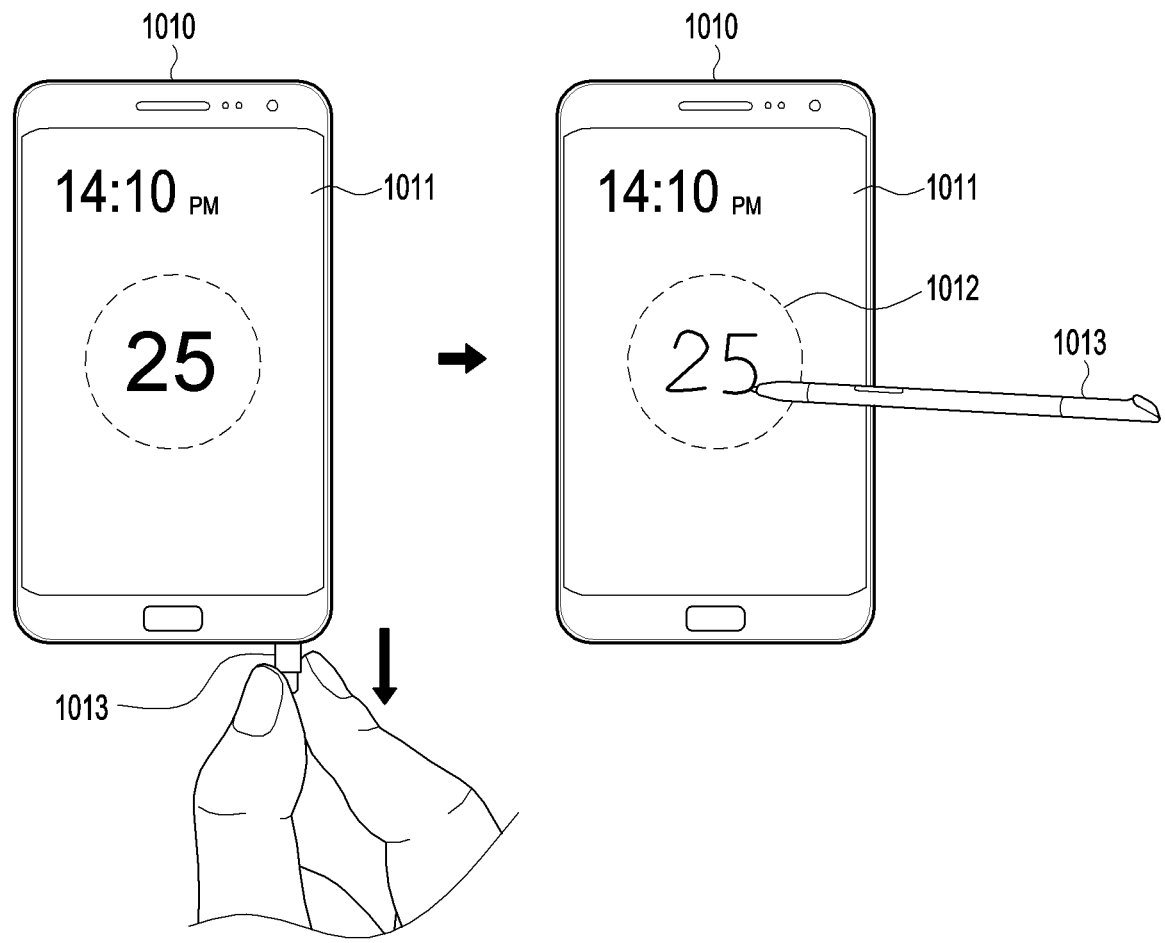
FIG. 10 is a diagram illustrating another example of a device control mode of an electronic device according to various embodiments of the present disclosure.

FIG. 10 is a diagram illustrating another example of a device control mode of an electronic device according to various embodiments of the present disclosure.

As illustrated in FIG. 10, when a pen input device 1013 installed in an electronic device 1010 is detached, the processor (e.g., the processor 120) may control a display 1011 to operate in a state (e.g., a device control mode) in which the display 1011 is capable of receiving a first input 1012 ("25").

For example, the first input 1012 may be input by a pen input device 1013.

Figure 11:
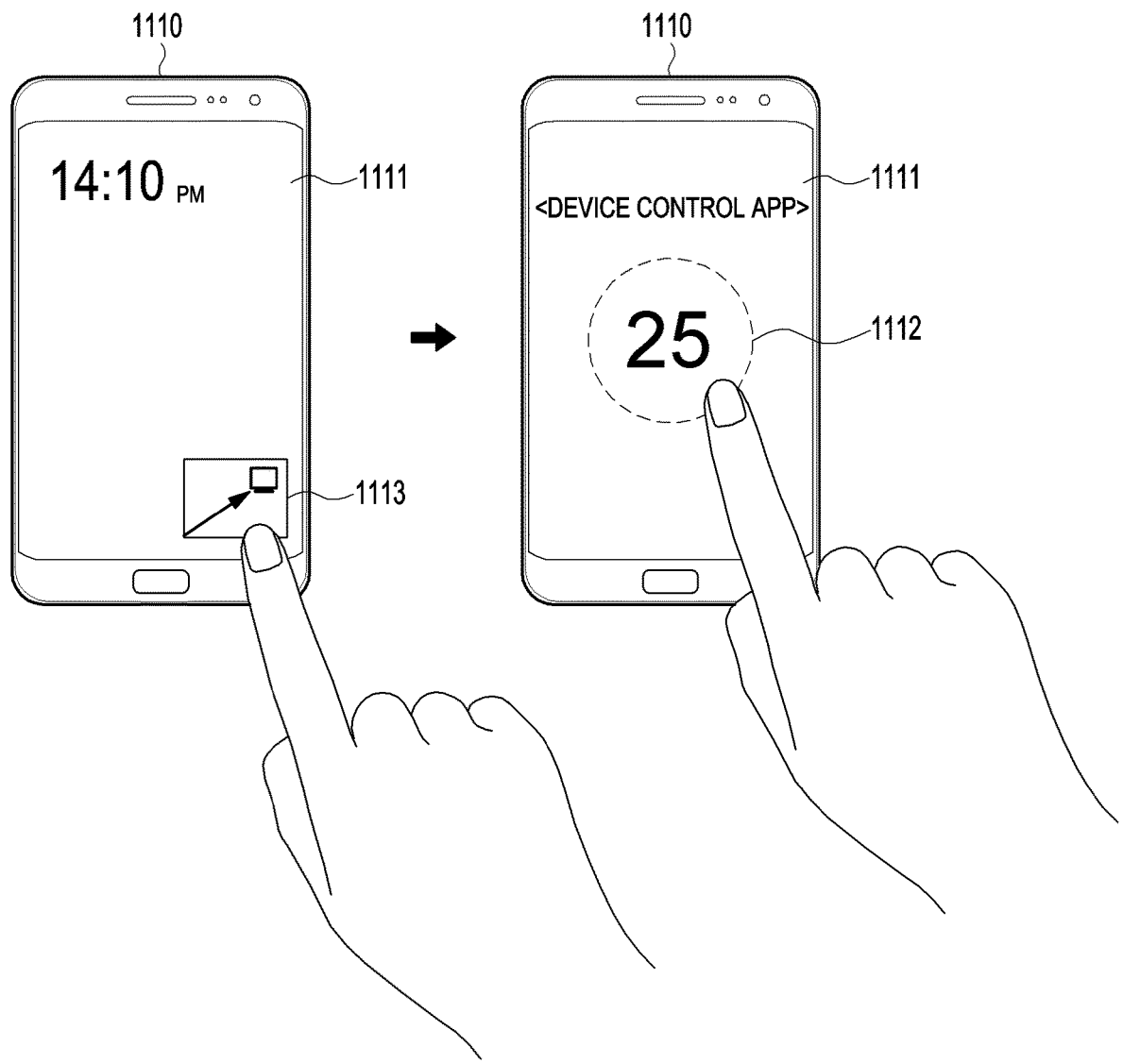
FIG. 11 is a diagram illustrating another example of a device control mode of an electronic device according to various embodiments of the present disclosure.

FIG. 11 is a diagram illustrating another example of a device control mode of an electronic device according to various embodiments of the present disclosure.

As illustrated in FIG. 11, a display 1111 may display a device control mode icon 1113 which enables a device control mode to be executed.

According to various embodiments, when an input on the device control mode icon 1113 is received, the processor (e.g., the processor 120) may execute a device control app, and may perform control such that a device control app screen is displayed via the display 1111.

When the device control app screen is displayed, the display 1111 may operate in a device control mode in which the display 1111 is capable of receiving a first input 1112 ("25"), and the display 1111 operating in the device control mode may receive the first input 1112 ("25").

Figure 12:
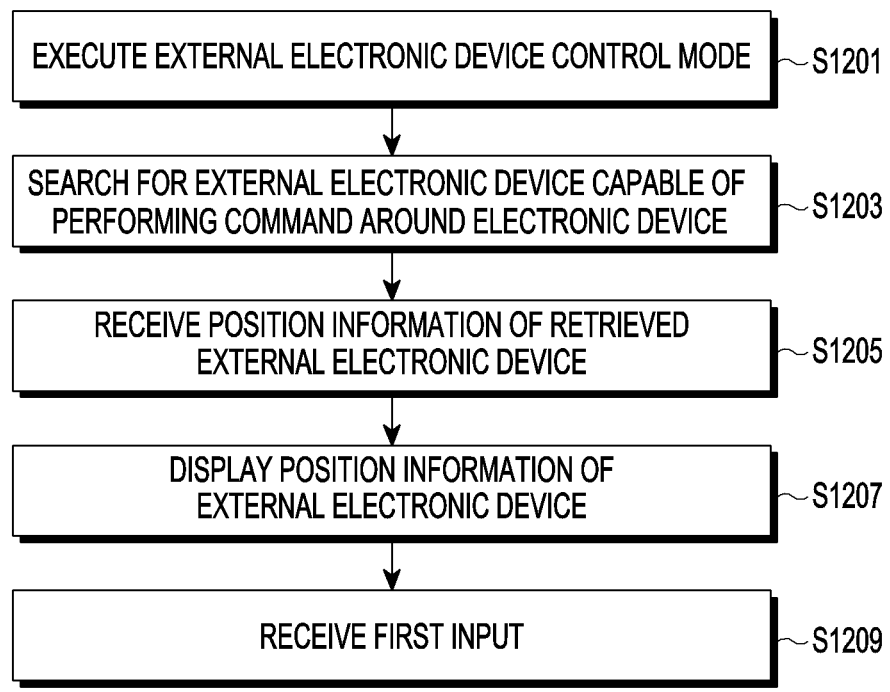
FIG. 12 is a flowchart illustrating a control method of an electronic device according to various embodiments of the present disclosure.

FIG. 12 is a flowchart illustrating a control method of an electronic device according to various embodiments of the present disclosure.

As illustrated in FIG. 12, according to various embodiments, in operation S1201, the processor (e.g., the processor 120) may execute a device control mode in which an external electronic device (e.g., the electronic device 102) is controlled.

According to various embodiments, in operation S1203, the processor 120 may search for an external electronic device (e.g., the external electronic device 102) which is capable of performing a command around the electronic device (e.g., the electronic device 101) via the communication module (e.g., the communication module 170).

According to various embodiments, in operation S1205, the processor 120 may receive position information of the external electronic device 102 retrieved via the communication module 170.

According to various embodiments, in operation S1207, the display (e.g., the display 160) may display the position information of the external electronic device 102 according to the control of the processor 120.

According to various embodiments, in operation S1209, the display 160 may receive a first input for controlling the external electronic device 102.

Figure 13:
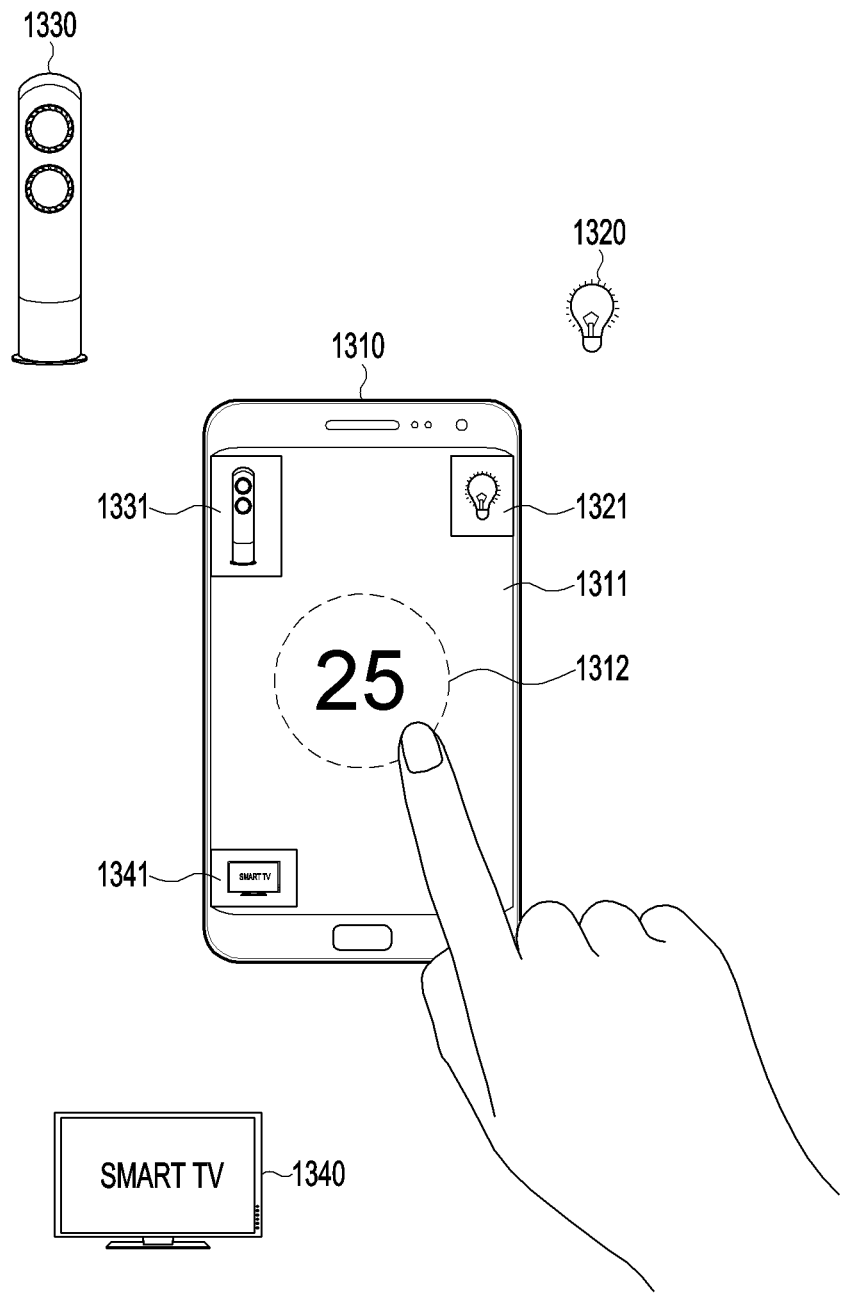
FIG. 13 is a diagram illustrating an example of a first input according to various embodiments of the present disclosure.

FIG. 13 is a diagram illustrating an example of a first input according to various embodiments of the present disclosure.

As illustrated in FIG. 13, according to various embodiments, a display 1311 of an electronic device 1310 may receive first device information 1321 corresponding to a first external electronic device 1320 (light) from among a plurality of external electronic devices, second device information 1331 corresponding to a second external electronic device 1330 (temperature controller), third device information 1341 corresponding to a third external electronic device 1340 (SMART TV), and a first input 1312 ("25") for controlling each external electronic device 1320, 1330, and 1340, and may display the first input 1312.

Figure 14C:
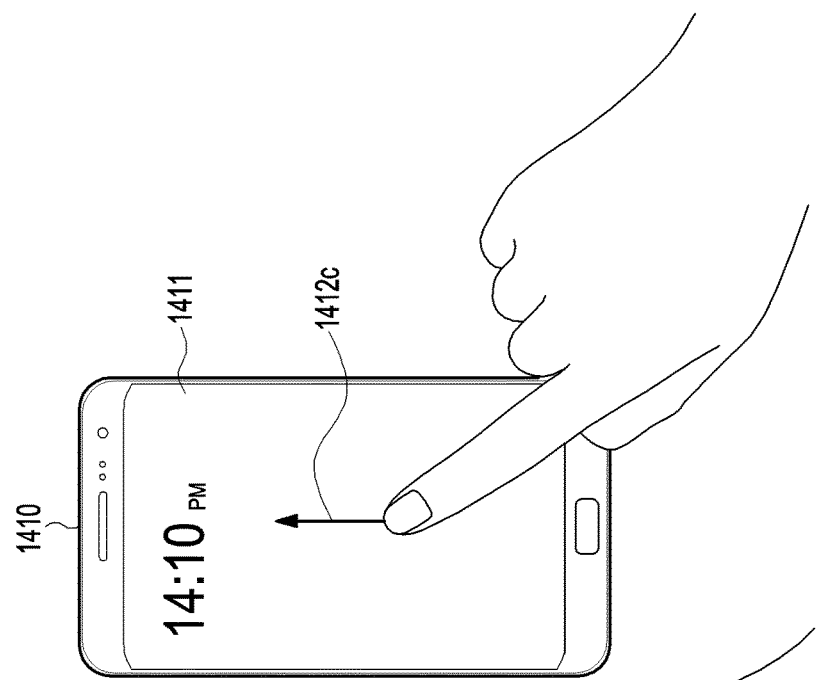
FIGS. 14A to 14C are diagrams illustrating other examples of a first input according to various embodiments of the present disclosure.
Figure 14B:
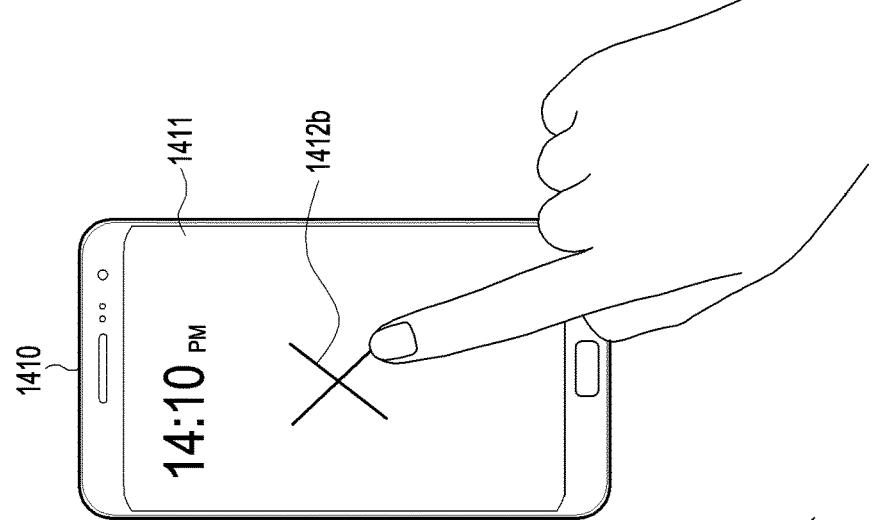
Figure 14A:
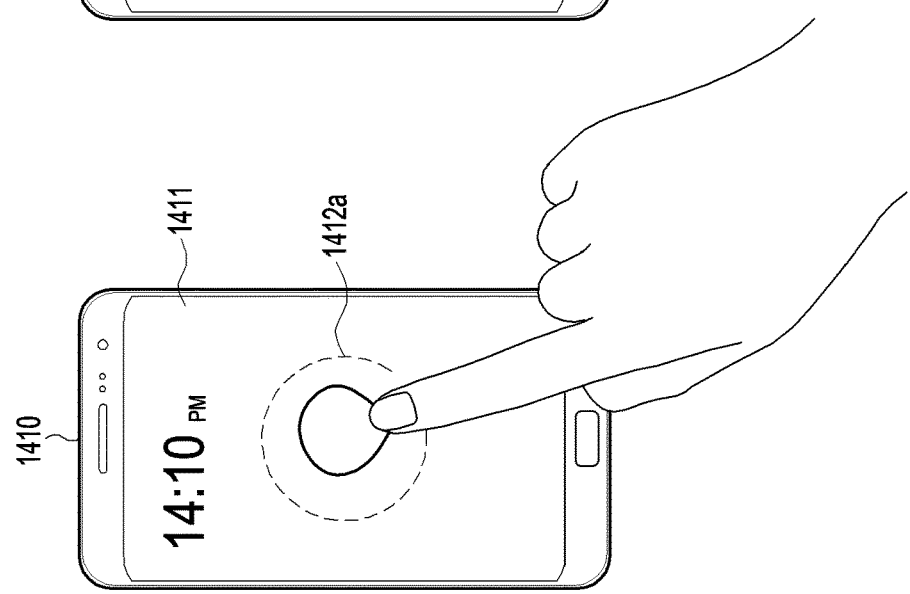

FIGS. 14A to 14C are diagrams illustrating other examples of a first input according to various embodiments of the present disclosure.

As illustrated in FIGS. 14A to 14C, the first input may include a figure input.

As illustrated in FIG. 14A, according to various embodiments, a display 1411 of an electronic device 1410 may receive a circle 1412a, as an example of the figure input.

As illustrated in FIG. 14B, according to various embodiments, the display 1411 of the electronic device 1410 may receive a cross 1412b, as another example of the figure input.

As illustrated in FIG. 14C, according to various embodiments, the display 1411 of the electronic device 1410 may receive an arrow 1412c, as another example of the figure input.

Figures 15A, 15B:
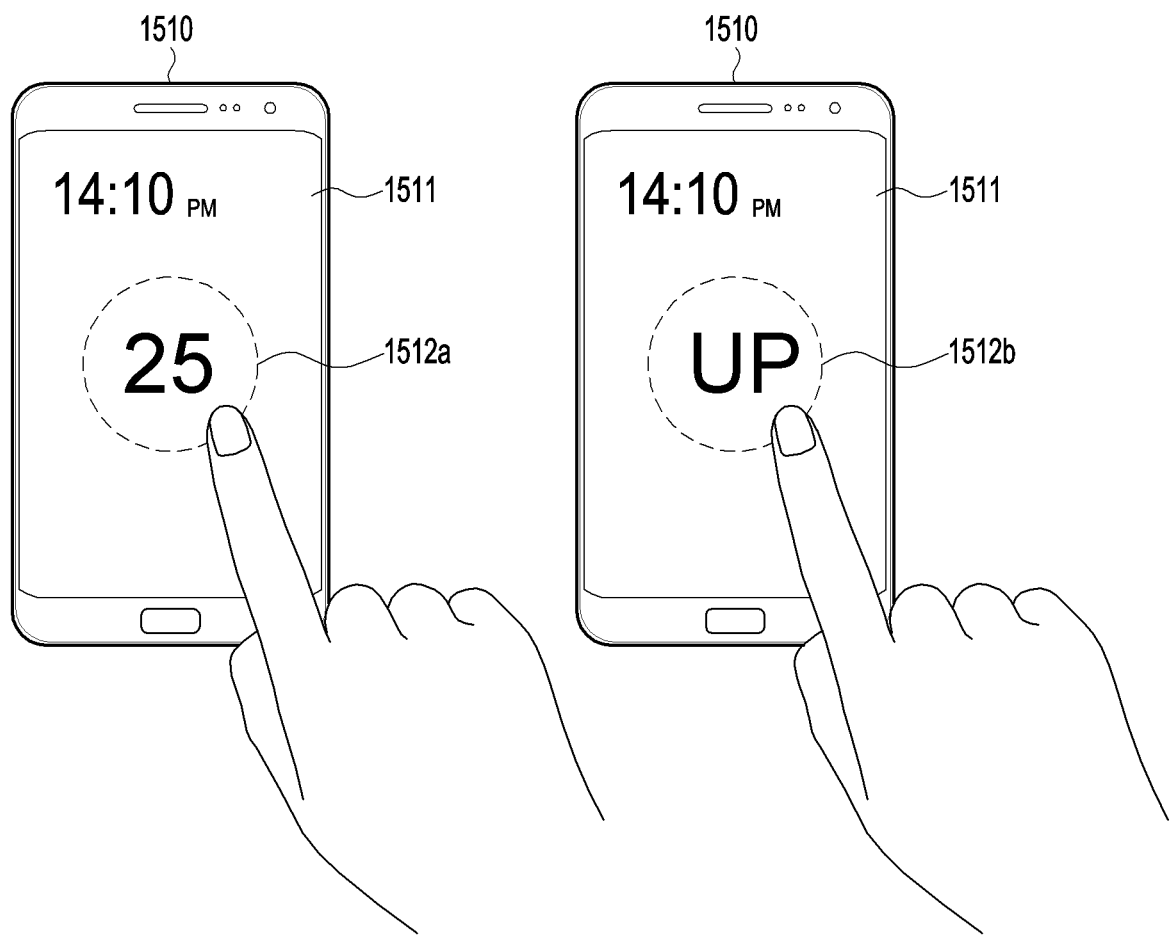
FIGS. 15A and 15B are diagrams illustrating other examples of a first input according to various embodiments of the present disclosure.

FIGS. 15A and 15B are diagrams illustrating other examples of a first input according to various embodiments of the present disclosure.

As illustrated in FIGS. 15A and 15B, the first input may include a text input.

As illustrated in FIG. 15A, according to various embodiments, a display 1511 of an electronic device 1510 may receive a number "25" 1512a, as an example of the text input.

As illustrated in FIG. 15B, according to various embodiments, the display 1511 of the electronic device 1510 may receive a character "UP" 1512b, as another example of the text input.

Figure 16A:
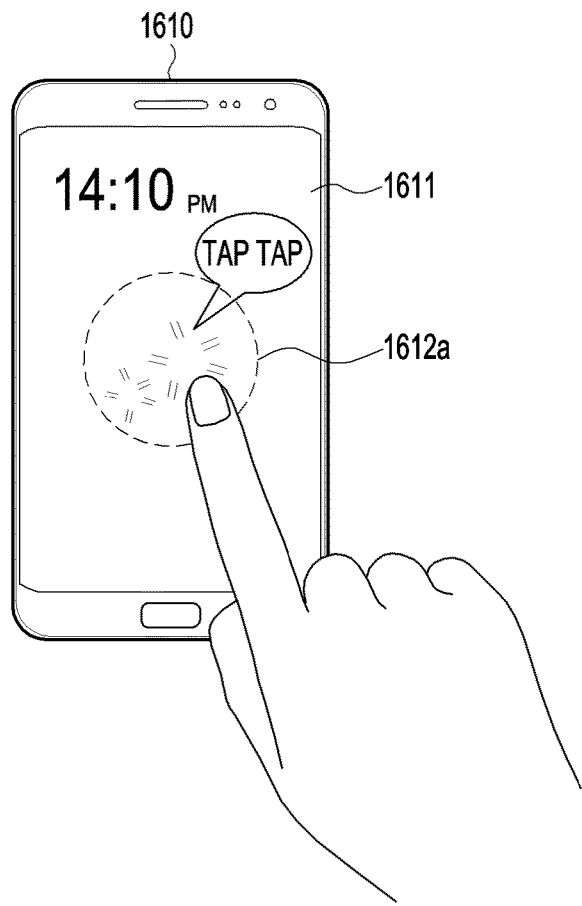
FIGS. 16A and 16B are diagrams illustrating other examples of a first input according to various embodiments of the present disclosure.
Figure 16B:
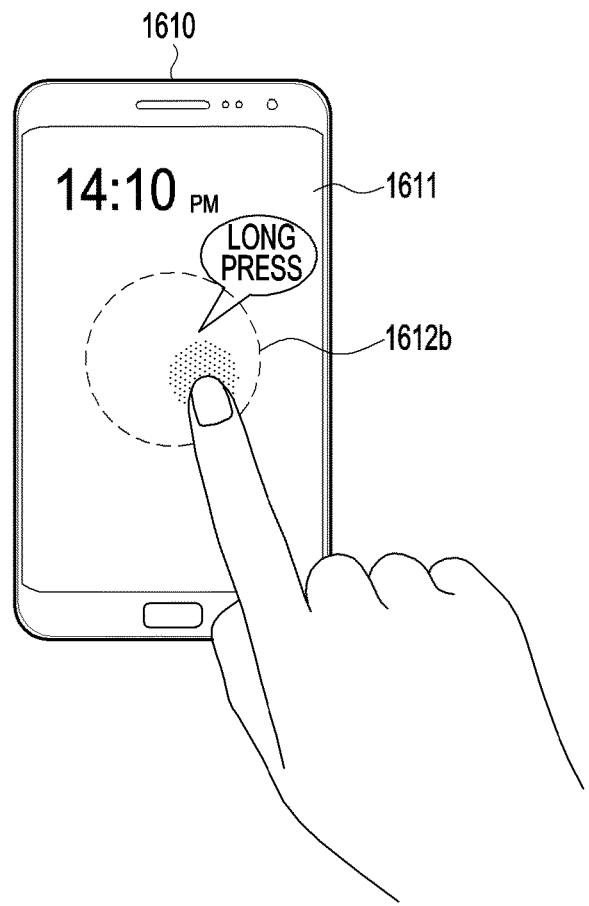

FIGS. 16A and 16B are diagrams illustrating other examples of a first input according to various embodiments of the present disclosure.

As illustrated in FIGS. 16A and 16B, the first input may include a touch input.

As illustrated in FIG. 16A, according to various embodiments, a display 1611 of an electronic device 1610 may receive a double-touch input 1612a (e.g., "tap tap"), as an example of the touch input.

As illustrated in FIG. 16B, according to various embodiments, the display 1611 of the electronic device 1610 may receive a long-touch input 1512b (e.g., "long press"), as another example of the touch input.

Figure 17:
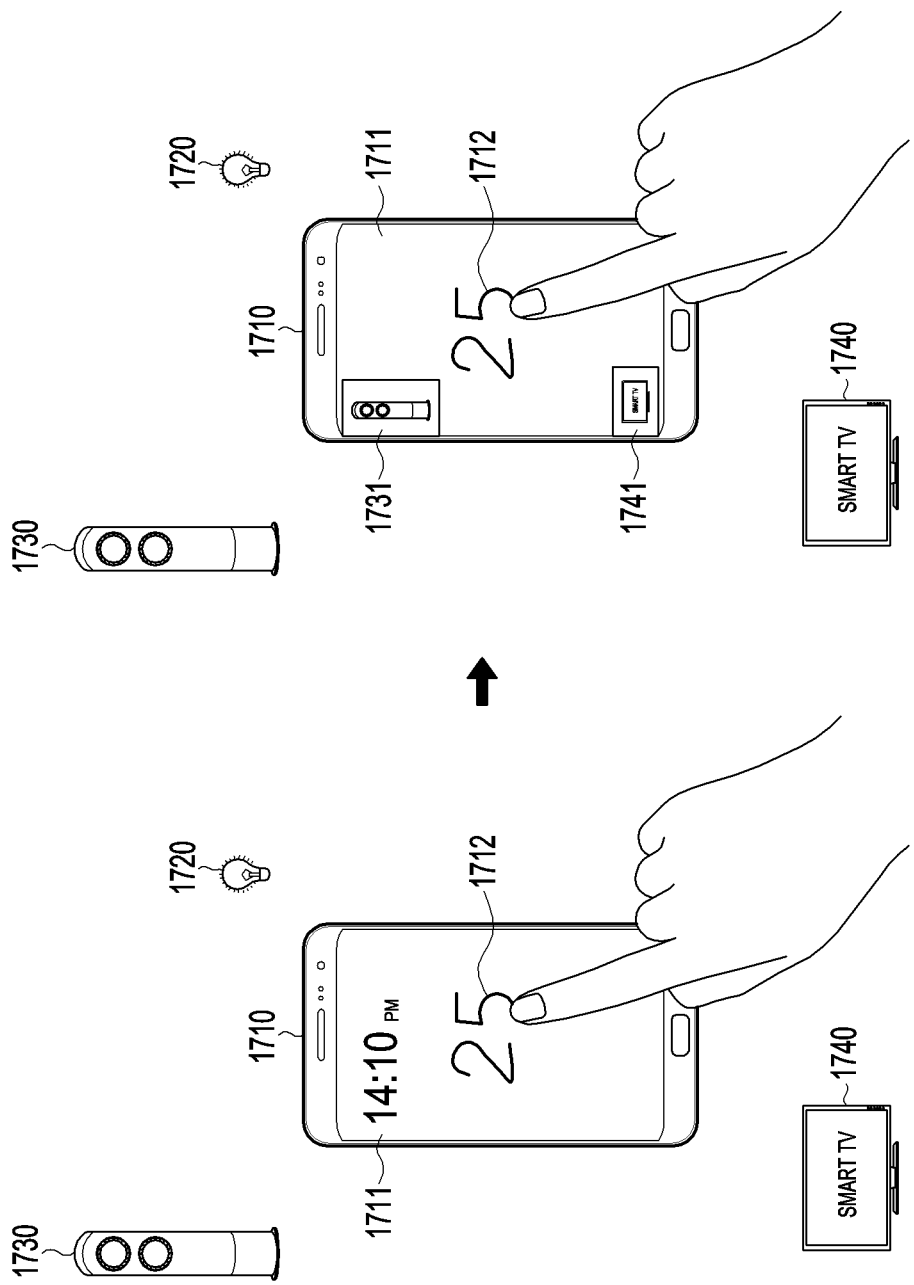
FIG. 17 is a diagram illustrating a method of displaying position information of an external electronic device according to various embodiments of the present disclosure.

FIG. 17 is a diagram illustrating a method of displaying position information of an external electronic device according to various embodiments of the present disclosure.

As illustrated in FIG. 17, for example, a display 1711 of an electronic device 1710 may receive a first input 1712 ("25") for controlling at least one electronic device from among a plurality of external electronic devices 1720, 1730, and 1740.

According to various embodiments, when the first input 1712 is received, the display 1712 may display device information 1731 and 1741 of at least one external electronic device 1730 and 1740 that is capable of performing a command based on the first input 1712 (command information including "25", for example, a command to change a channel to 25 and a command to change a temperature to 25° C.) from among the plurality of external electronic devices 1720, 1730, and 1740, according to control of the processor (e.g., the processor 120).

Figure 18A:
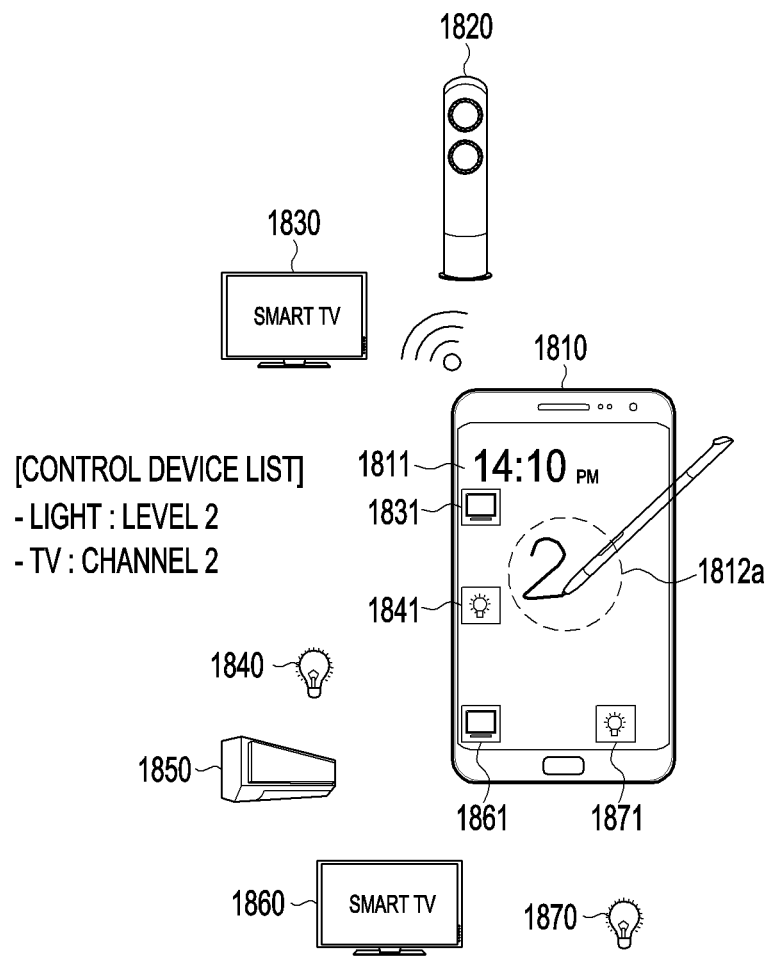
FIGS. 18A to 18C are diagrams illustrating a method of displaying device information in real time according to a part of a first input according to various embodiments of the present disclosure.
Figure 18B:
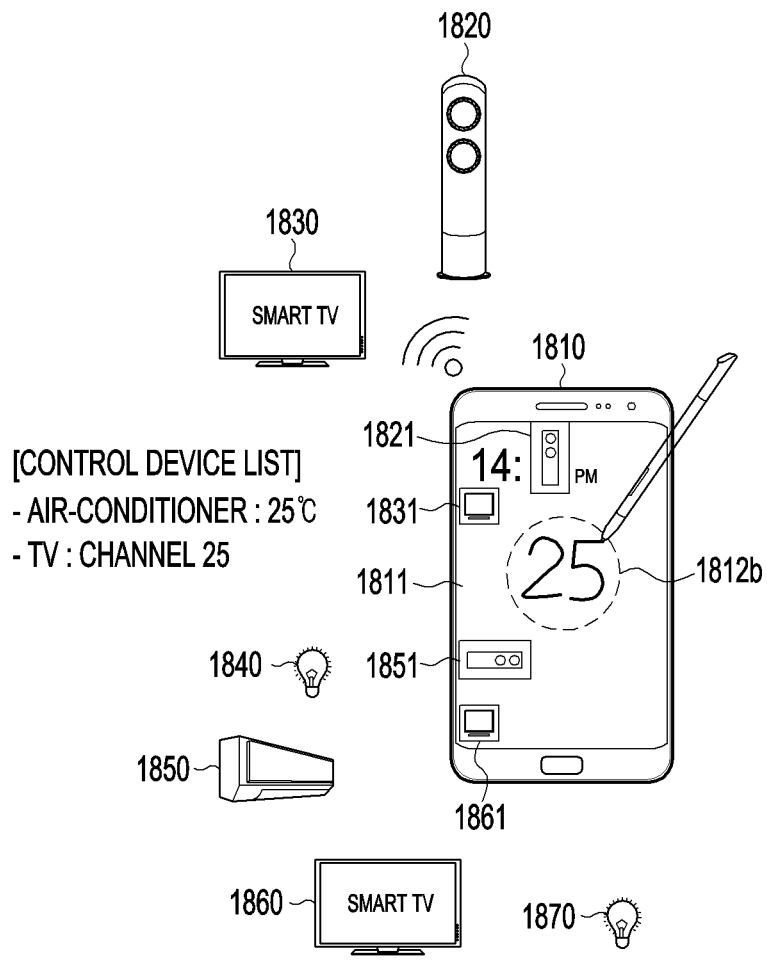
Figure 18C:
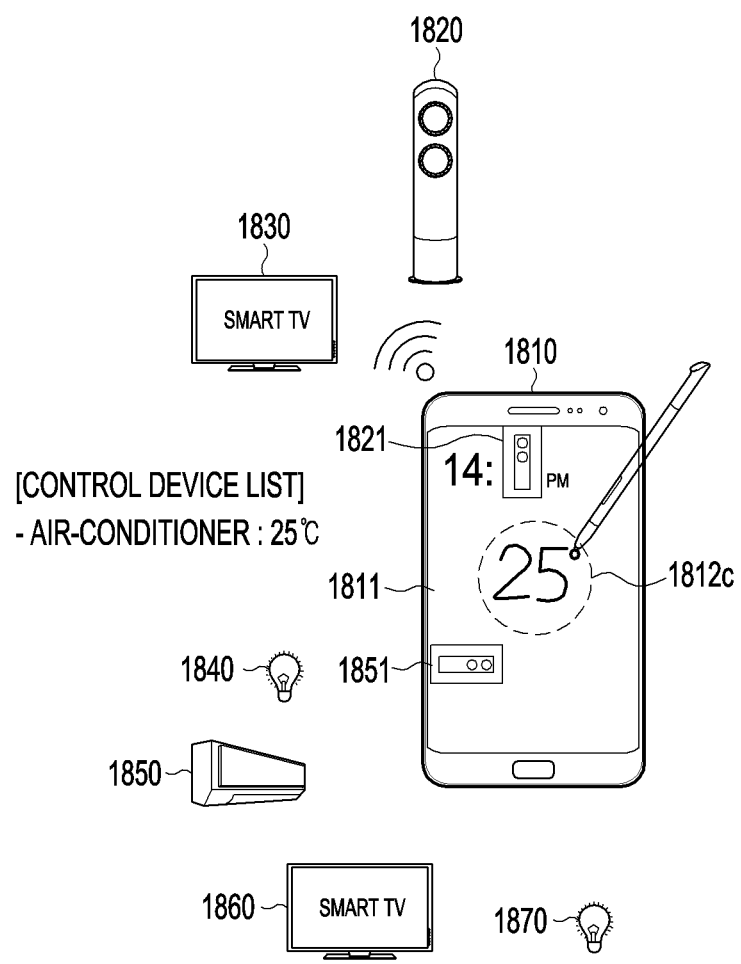

FIGS. 18A to 18C are diagrams illustrating a method of displaying device information in real time according to a part of a first input according to various embodiments of the present disclosure.

For example, the first input may include a first command input and a second command input received after the first command input is received.

As illustrated in FIG. 18A, according to various embodiments, a display 1811 of an electronic device 1810 may receive a first command input 1812a ("2") for controlling at least one of a plurality of external electronic devices 1820, 1830, 1840, 1850, 1860, and 1870. According to various embodiments, when the first command input 1812a ("2") is received, the display 1811 may display device information 1831, 1841, 1861, and 1871 of at least one external electronic device 1830, 1840, 1860, and 1870 that is capable of performing a command based on the first command input 1812a ("2") (command information including "2", for example, a command to change a light level to 2 and a command to change a channel to 2) from among the plurality of external electronic devices 1820, 1830, 1840, 1850, 1860, and 1870, according to control of the processor (e.g., the processor 120).

As illustrated in FIG. 18B, according to various embodiments, the display 1811 may receive a second command input ("5") after receiving the first command input 1812a ("2") for controlling at least one of the plurality of external electronic devices 1820, 1830, 1840, 1850, 1860, and 1870. According to various embodiments, when a third command input 1812b ("25") including the first command input ("2") and the second command input ("5") is received, the display 1811 may display device information 1821, 1831, 1851, and 1861 corresponding to each of at least one external electronic device 1820, 1830, 1850, and 1860 which is capable of performing a command based on the third command input 1812b ("25") (all commands including 25, for example, a command to change a desired temperature to 25° C. or a command to change a channel to 25) from among the plurality of external electronic devices 1820, 1830, 1840, 1850, 1860, and 1870, according to the control of the processor 120.

As illustrated in FIG. 18C, according to various embodiments, the display 1811 may receive the first command input 1812a ("2") for controlling at least one of a plurality of external electronic devices 1820, 1830, 1840, 1850, 1860, and 1870, then receives a second command input ("5"), and then receives a third command input ("°"). According to various embodiments, when a fourth command input 1812c ("25° C.") including the first command input ("2"), the second command input ("5"), and the third command input ("°") is received, the display 1811 may display device information 1821 and 1851 corresponding to each of at least one external electronic device 1820 and 1850 which is capable of performing a command based on the fourth command input 1812c ("25° C.") (all commands including 25° C., for example, a command to change a desired temperature to 25° C.) from among the plurality of external electronic devices 1820, 1830, 1840, 1850, 1860, and 1870, according to the control of the processor 120.

Figure 19:
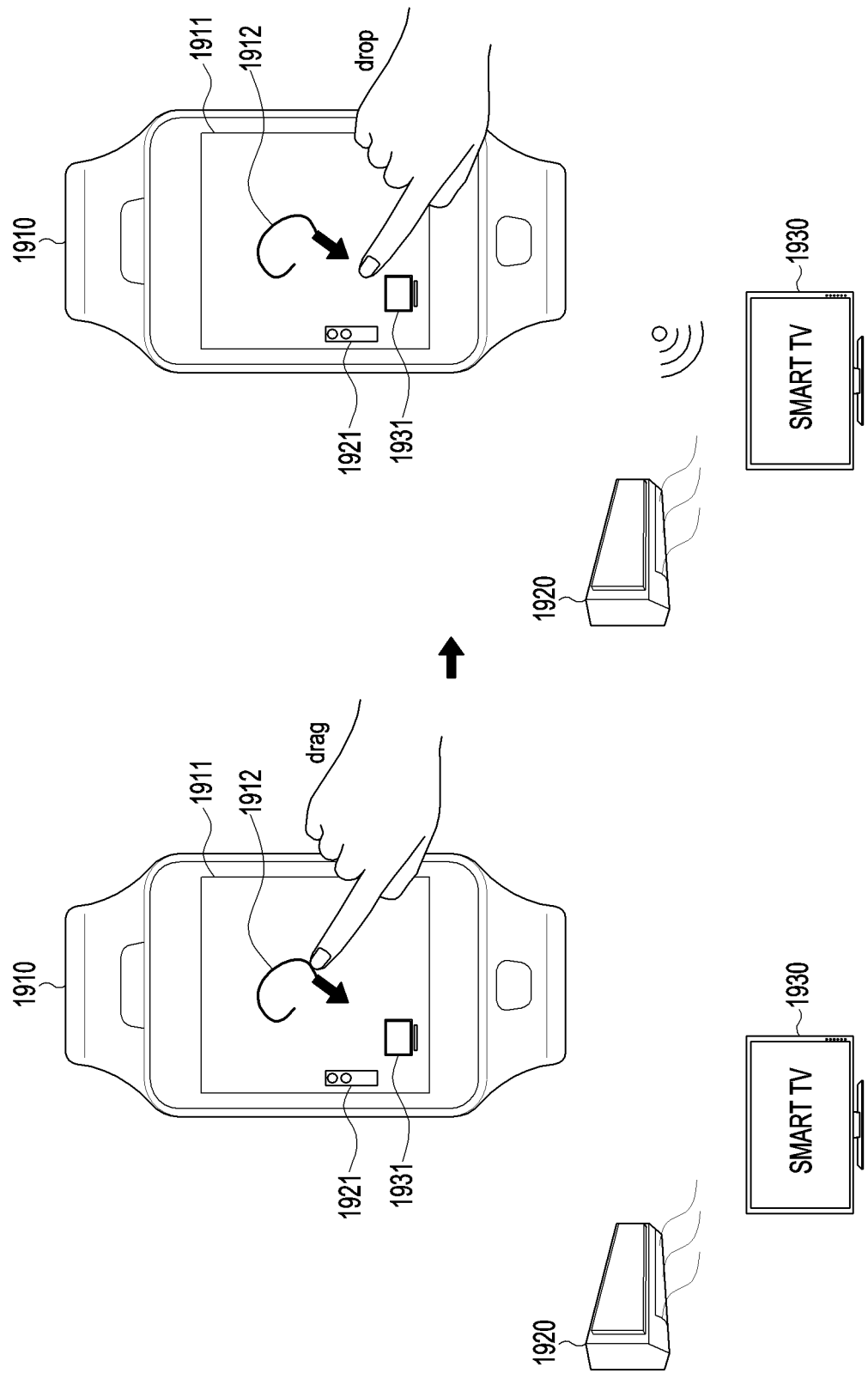
FIG. 19 is a diagram illustrating a method of controlling an external electronic device by an electronic device according to various embodiments of the present disclosure.

FIG. 19 is a diagram illustrating a method of controlling an external electronic device by an electronic device according to various embodiments of the present disclosure.

As illustrated in FIG. 19, in the state in which device information 1921 and 1931 corresponding to each of a plurality of external electronic devices 1920 and 1930 is displayed via a display 1911, when a first input (a circle) 1912 is received via the display 1911, and a second input is received in the direction of second device information 1931 corresponding to the second external electronic device 1930 from among a plurality of pieces of device information 1921 and 1931 after the first input 1912 is received, the processor (e.g., the processor 120) may transmit a control signal including a control command (ON command) corresponding to the first input 1912 to the second external electronic device 1930 via the communication module (e.g., the communication module 170).

Figure 20:
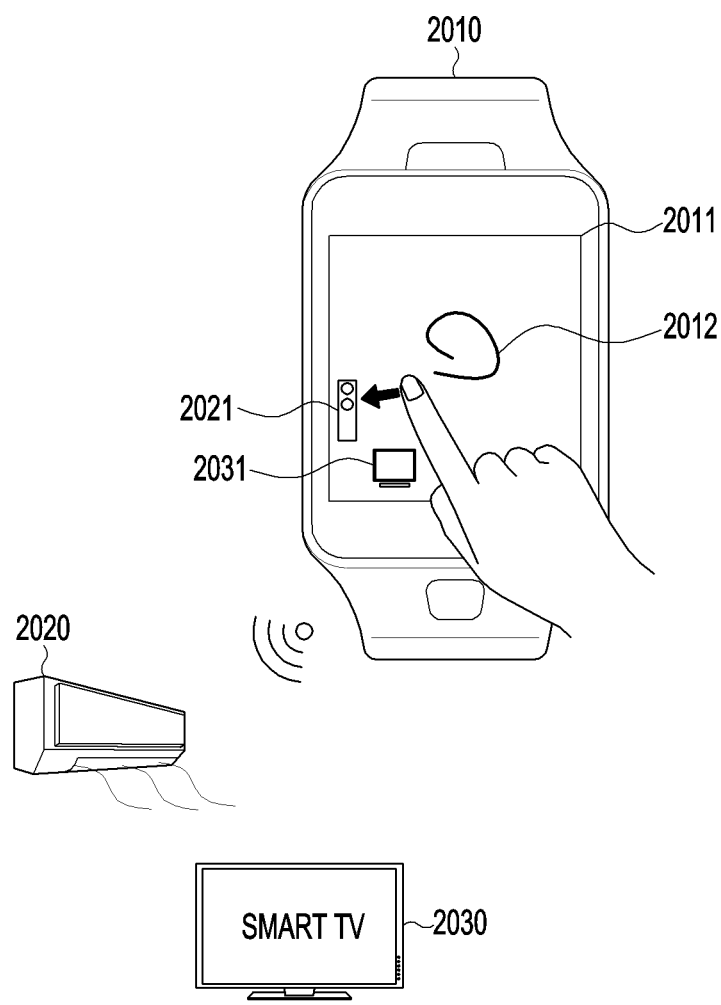
FIG. 20 is a diagram illustrating a method of controlling an external electronic device by an electronic device according to various embodiments of the present disclosure.

FIG. 20 is a diagram illustrating a method of controlling an external electronic device by an electronic device according to various embodiments of the present disclosure.

As illustrated in FIG. 20, in the state in which device information 2021 and 2031 corresponding to each of a plurality of external electronic devices 2020 and 2030 is displayed via a display 2011 of an electronic device 2010, when a first input 2012 (a circle) is received via the display 2011, and a second input is received in the direction of first device information 2021 corresponding to the first external electronic device 2020 from among a plurality of pieces of device information 2021 and 2031 after the first input 2012 is received, the processor (e.g., the processor 120) may transmit a control signal including a control command (ON command) corresponding to the first input 2012 to the first external electronic device 2020 via the communication module (e.g., the communication module 170).

Figure 21:
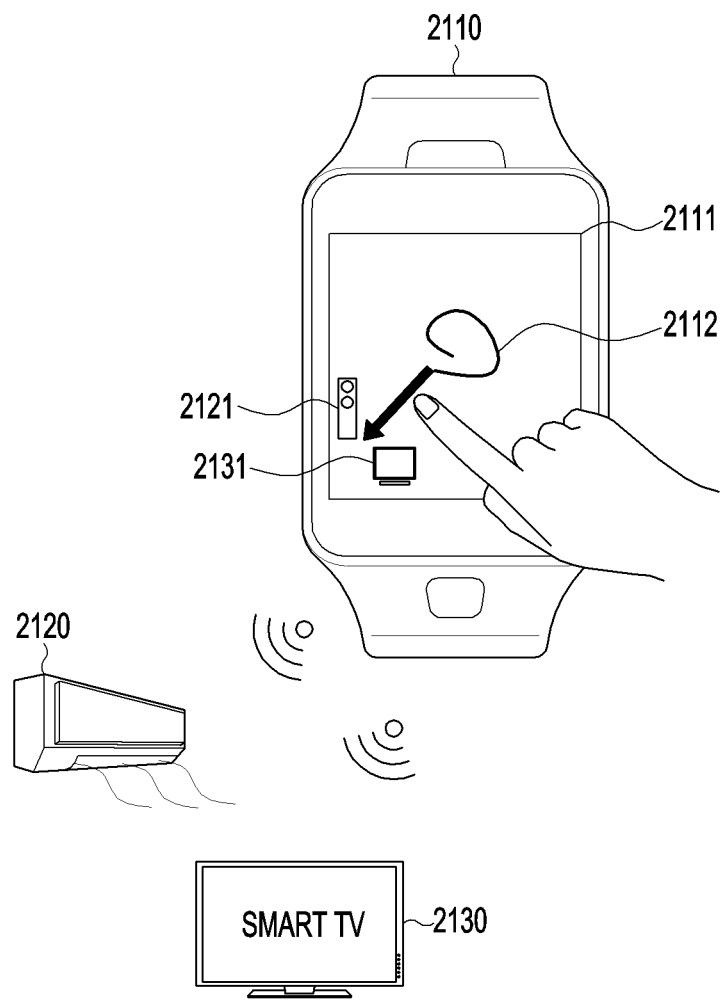
FIG. 21 is a diagram illustrating a method of controlling two external electronic devices by an electronic device according to various embodiments of the present disclosure.

FIG. 21 is a diagram illustrating a method of controlling two external electronic devices by an electronic device according to various embodiments of the present disclosure.

As illustrated in FIG. 21, in the state in which device information 2121 and 2131 corresponding to each of a plurality of external electronic devices 2121 and 2130 is displayed via a display 2111 of an electronic device 2110, when a first input 2112 (a circle) is received via the display 2111, and a second input is received in the direction corresponding to a plurality of pieces of device information 2121 and 2131 after the first input 2112 is received, the processor (e.g., the processor 121) may transmit a control signal including a control command (ON command) corresponding to the first input 2112 to the first external electronic device 2120 and the second external electronic device 2130 via the communication module (e.g., the communication module 170).

Figure 22:
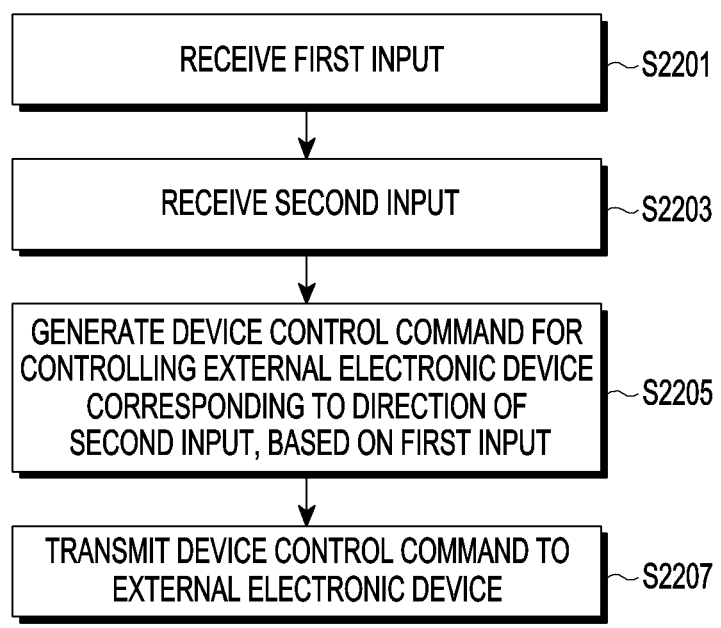
FIG. 22 is a flowchart illustrating a method of generating a device control command according to various embodiments of the present disclosure.

FIG. 22 is a flowchart illustrating a method of generating a device control command according to various embodiments of the present disclosure.

As illustrated in FIG. 22, according to various embodiments, a display (e.g., the display 160) may receive a first input in operation 52201, and may receive a second input in operation 52203.

According to various embodiments, in operation 52205, the processor (e.g., the processor 120) may generate a device control command for controlling an external electronic device corresponding to the direction of the second input, based on the first input.

According to various embodiments, in operation 52207, the processor 120 may transmit the device control command to the external electronic device via a communication module (e.g., the communication module 170).

Figure 23:
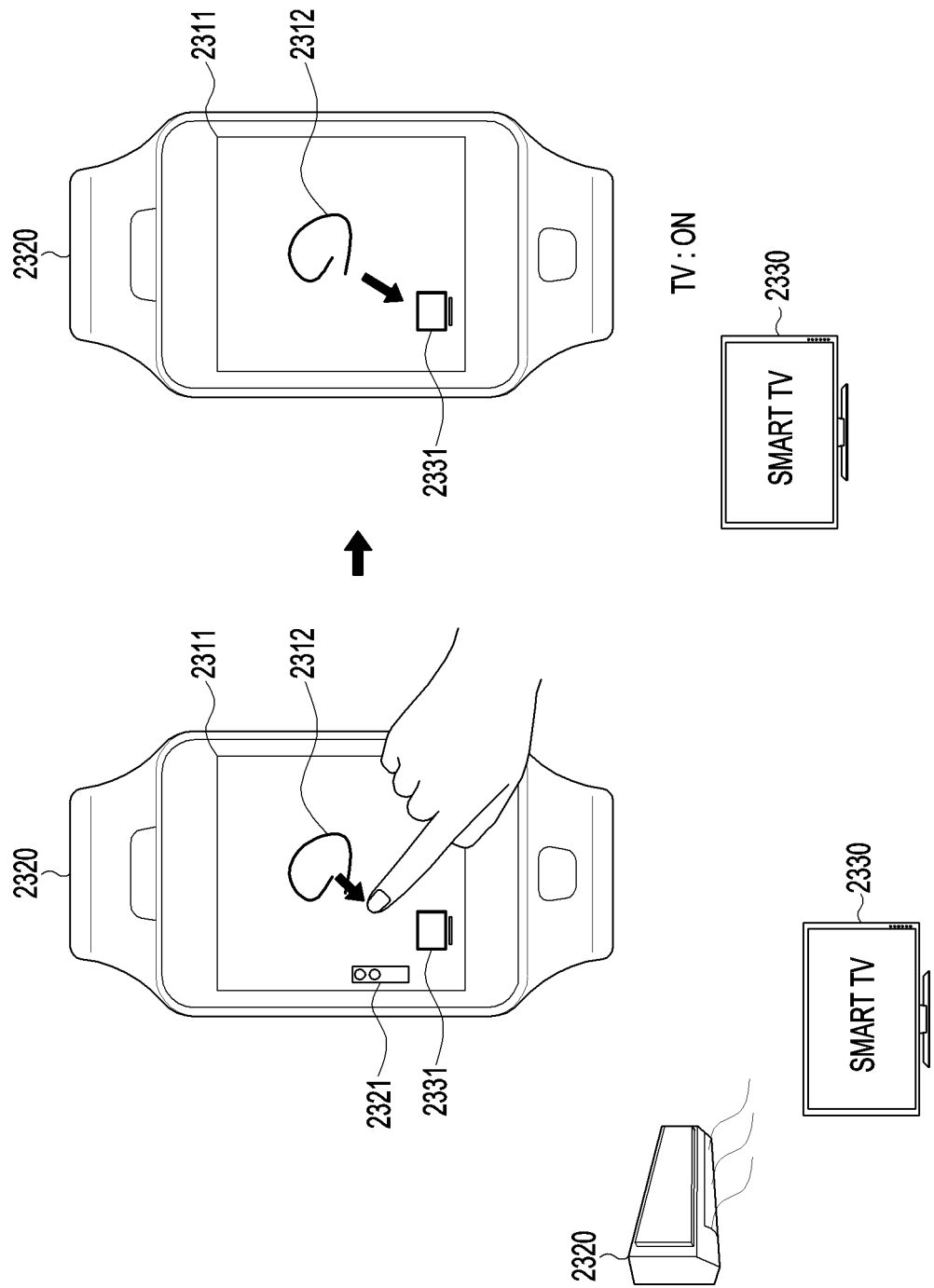
FIG. 23 is a diagram illustrating a method of displaying device information in real time according to a part of a second input according to various embodiments of the present disclosure.

FIG. 23 is a diagram illustrating a method of displaying device information in real time according to a part of a second input according to various embodiments of the present disclosure.

For example, the second input may include a first gesture input and a second gesture input received after the first gesture input is received. For example, the first gesture input may indicate a first direction, and the second gesture input may indicate a second direction. The first direction and the second direction are the same direction or different directions.

As illustrated in FIG. 23, according to various embodiments, a display 2311 of an electronic device 2320 may receive a first command input (a circle) 2312 for controlling at least one of a plurality of external electronic devices 2320 and 2330, and may display device information 2321 and 2331 corresponding to the plurality of external electronic devices 2320 and 2330.

According to various embodiments, the first command input 1812a is received, and the display 2311 may receive a first gesture input provided in a first direction, which is the direction of a second external electronic device 2330 from among the plurality of external electronic devices 2320 and 2330. According to the first gesture input provided in the first direction, which is the direction of the second external electronic device 2330, the display 2311 may display second device information 2331 corresponding to the first direction, which is the direction of the first gesture input from among the plurality of external electronic devices 2320 and 2330, and may transmit a control command (ON command) to the second external electronic device 2330 according to a first input and a second input.

Figure 24:
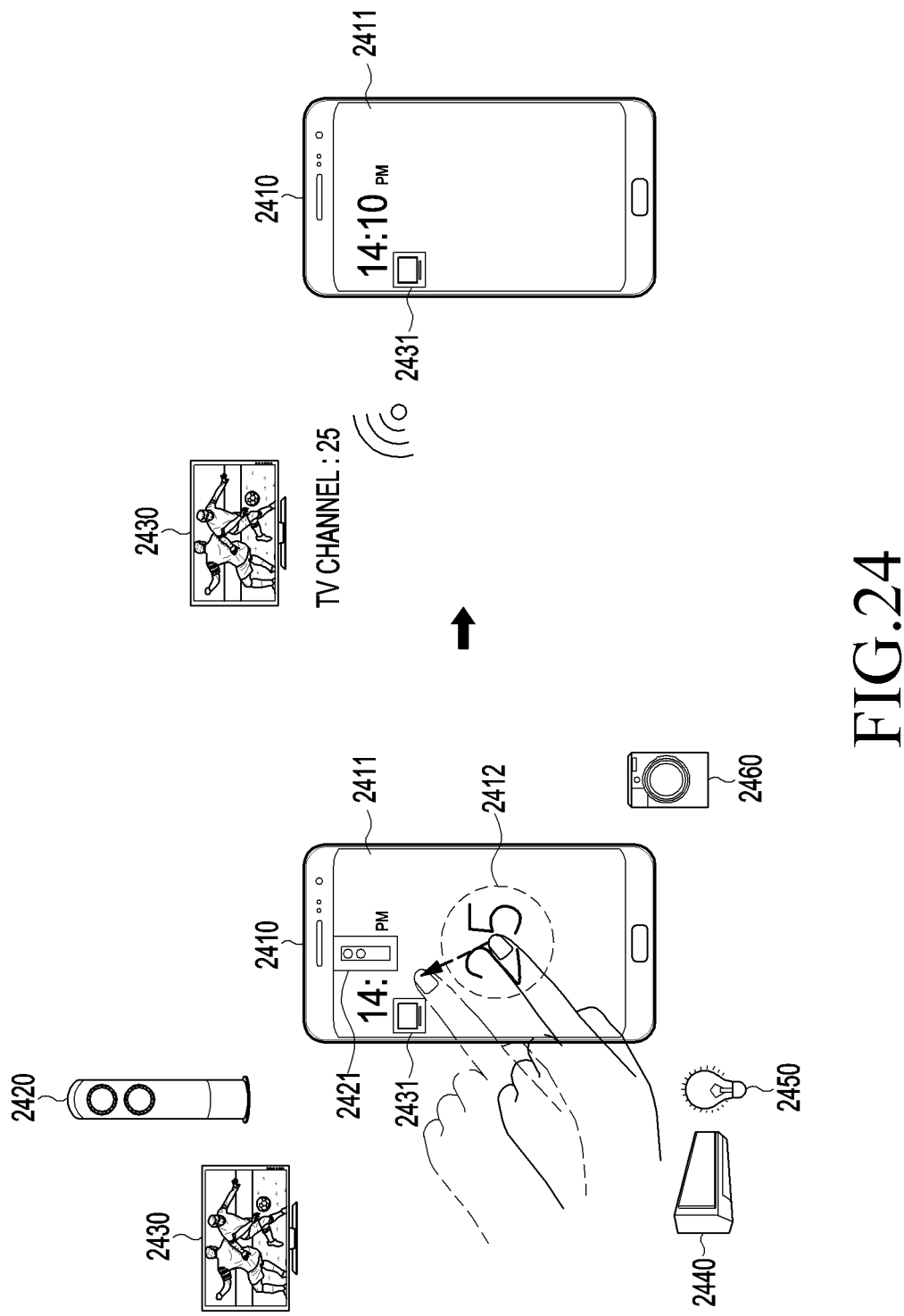
FIG. 24 is a diagram illustrating a method of displaying device information in real time according to a part of a second input according to various embodiments of the present disclosure.

FIG. 24 is a diagram illustrating a method of displaying device information in real time according to a part of a second input according to various embodiments of the present disclosure.

As illustrated in FIG. 24, according to various embodiments, a display 2411 of an electronic device 2420 may receive a first command input 2412 ("25") for controlling at least one of a plurality of external electronic devices 2420, 2430, 2440, 2450, and 2460. The display 2411 may receive a first gesture input provided in a first direction, which is the direction of the first external electronic device 2420 and the second external electronic device 2430 from among the plurality of external electronic devices 2420, 2430, 2440, 2450, and 2460. The display 2411 may display first device information 2421 and second device information 2431 corresponding to the first direction, which is the direction of the first gesture input from among the plurality of external electronic devices 2420, 2430, 2440, 2450, and 2460.

According to various embodiments, the display 2411 may receive the first gesture input provided in the first direction, and may receive a second gesture input provided in a second direction, which is the direction of the first external electronic device 2420 from among the plurality of external electronic devices 2420, 2430, 2440, 2450, and 2460. According to the second gesture input provided in the second direction, the display 2411 may display first device information 2421 corresponding to the second direction, which is the direction of the second gesture input, from among the plurality of external electronic devices 2420, 2430, 2440, 2450, and 2460.

An electronic device for controlling a plurality of external electronic devices according to various embodiments may include: a communication module configured to transmit a control signal to each of the plurality of external electronic devices; a display configured to receive a first input for controlling each of the plurality of external electronic devices and a second input provided in a predetermined direction; and a processor configured to control the communication module such that a control signal corresponding to the received first input is transmitted to at least one external electronic device corresponding to the direction of the second input, from among the plurality of external electronic devices.

According to various embodiments, the processor is configured to control the display such that command information associated with the first input is displayed.

According to various embodiments, the first input includes at least one of a character input, a number input, a symbol input, and one or more touch inputs; and the second input includes at least one of one or more swipe inputs provided in a predetermined direction and one or more drag-and-drop inputs.

According to various embodiments, the processor may control the display such that device information corresponding to each of the plurality of external electronic devices is displayed.

According to various embodiments, the device information includes position information of each of the plurality of external electronic devices.

According to various embodiments, the processor may control the display so as to display device information of an external electronic device, which is capable of performing a command of the control signal corresponding to the received first input, from among the plurality of external electronic devices.

According to various embodiments, the first input may include a first command input and a second command input received after the first command input is received. When the first command input is received via the display, the processor may control the display so as to display device information of an external electronic device that is capable of performing a command of a first control signal corresponding to the first command input, and when the second command input is received after the first command input is received via the display, the processor may control the display so as to display device information of an external electronic device that is capable of performing a command of a second control signal corresponding to a third command input including the first command input and the second command input.

According to various embodiments, the processor may control the display so as to display device information of an external electronic device corresponding to the direction of the second input, from among the plurality of external electronic devices.

According to various embodiments, the second input may include a first gesture input and a second gesture input received after the first gesture input is received. When the first gesture input is received via the display, the processor may display device information of an external electronic device corresponding to a first direction in which the first gesture input is provided, and when the second gesture input is received after the first gesture input is received via the display, the processor may control the display so as to display device information of an external electronic device corresponding to a second direction in which the second gesture input is provided.

A method of controlling a plurality of external electronic devices by an electronic device may include: receiving a first input for controlling each of the plurality of external electronic devices; and transmitting a control signal corresponding to the received first input to at least one external electronic device corresponding to a direction in which the second input is received by the electronic device, from among the plurality of external electronic devices.

According to various embodiments, the method may further include displaying command information associated with the first input.

According to various embodiments, the first input may include at least one of a character input, a number input, a symbol input, and one or more touch inputs.

According to various embodiments, the second input may include at least one of one or more swipe inputs provided in a predetermined direction and one or more drag-and-drop inputs.

According to various embodiments, the method may further include displaying device information corresponding to each of the plurality of external electronic devices.

According to various embodiments, the device information may include position information of each of the plurality of external electronic devices.

According to various embodiments, the operation of displaying the device information may include displaying device information of an external electronic device, which is capable of performing a command of the control signal corresponding to the received first input, from among the plurality of external electronic devices.

According to various embodiments, the operation of receiving the first input may include: receiving a first command input; and receiving a second command input. The operation of displaying device information of an external electronic device that is capable of performing a command of a control signal corresponding to the received first input may include: displaying device information of an external electronic device capable of performing a command of a first control signal corresponding to the first command input when the first command input is received; and displaying device information of an external electronic device capable of performing a command of a second control signal corresponding to a third command input including the first command input and the second command input.

According to various embodiments, the operation of transmitting the control signal to at least one external electronic device may include: receiving a second input, which is input to the electronic device; and displaying device information of an external electronic device corresponding to a direction of the second input, from among the plurality of external electronic devices.

According to various embodiments, the operation of receiving the second input may include: receiving a first gesture input; and receiving a second gesture input. The operation of displaying device information of an external electronic device corresponding to a direction in which the second input is provided may include: displaying device information of an external electronic device corresponding to a first direction in which the first gesture input is provided; and displaying device information of an external electronic device corresponding to a second direction in which the second gesture input is provided.

A control method of an electronic device for controlling a plurality of external electronic devices according to various embodiments of the present disclosure may include: receiving a first input for controlling each of the plurality of external electronic devices; receiving a second input for selecting at least one external electronic device of the plurality of external electronic devices; and transmitting a control signal corresponding to the first input to at least one external electronic device selected based on the second input, based on the first input and the second input.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added. Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

The invention claimed is:

1. An electronic device comprising:
a communication device;
a display; and
a processor configured to:
receive, through the display, a first input, wherein the first input corresponds to a plurality of commands,
based on receiving the first input, identify a plurality of external electronic devices, each capable of receiving a command corresponding to the first input,
receive, through the display, a second input,
based on the second input being received in a first direction, identify a first external electronic device corresponding to the first direction among the plurality of external electronic devices, identify a first command for a first operation based on the first external electronic device, and
transmit, through the communication device, to the first external electronic device, the first command for the first operation of the first external electronic device, and
based on the second input being received in a second direction, identify a second external electronic device corresponding to the second direction among the plurality of external electronic devices, identify a second command for a second operation based on the second external electronic device, and transmit, through the communication device, to the second external electronic device, the second command for the second operation of the second external electronic device,
wherein the first operation is different from the second operation.

2. The electronic device of claim 1, wherein the processor is further configured to display, through the display, command information on each of the plurality of commands corresponding to the first input.

3. The electronic device of claim 1,
wherein the first input includes at least one of a character input, a number input, a symbol input, or one or more touch inputs; and
wherein the second input includes at least one of one or more swipe inputs provided in a predetermined direction or one or more drag-and-drop inputs.

4. The electronic device of claim 1, wherein the processor is further configured to display, through the display, device information on each of the plurality of external electronic devices.

5. The electronic device of claim 4, wherein the device information includes position information on each of the plurality of external electronic devices.

6. The electronic device of claim 4, wherein each of the plurality of external electronic devices is capable of performing an operation based on a command among the plurality of commands.

7. The electronic device of claim 4, wherein the processor is further configured to:
based on the second input being received in the first direction, display, through the display, first device information of the first external electronic device, and
based on the second input being received in the second direction, display, through the display, second device information of the second external electronic device.

8. The electronic device of claim 1, wherein the first input includes information for separately controlling each of the plurality of external electronic devices.

9. A method of controlling an electronic device, the method comprising:
receiving a first input, wherein the first input corresponds to a plurality of commands;
based on receiving the first input, identifying a plurality of external electronic devices, each capable of receiving a command corresponding to the first input;
receiving a second input;
based on the second input being received in a first direction, identifying a first external electronic device corresponding to the first direction among the plurality of external electronic devices, identifying a first command for a first operation based on the first external electronic device, and transmitting, to the first external electronic device, the first command for the first operation of the first external electronic device; and based on the second input being received in a second direction, identifying a second external electronic device corresponding to the second direction among the plurality of external electronic devices, identifying a second command for a second operation based on the second external electronic device, and transmitting, to the second external electronic device, the second command for the second operation of the second external electronic device, wherein the first operation is different from the second operation.

10. The method of claim 9, further comprising:

displaying command information on each of the plurality of commands corresponding to the first input.

11. The method of claim 9, wherein the first input includes at least one of a character input, a number input, a symbol input, or one or more touch inputs.

12. The method of claim 9, wherein the second input includes at least one of one or more swipe inputs provided in a predetermined direction or one or more drag-and-drop inputs.

13. The method of claim 9, further comprising:

displaying device information on each of the plurality of external electronic devices.

14. The method of claim 13, wherein the device information includes position information on each of the plurality of external electronic devices.

15. The method of claim 13, wherein each of the plurality of external electronic devices is capable of performing an operation based on a command among the plurality of commands.

\* \* \* \* \*